United States Patent
Cai et al.

(10) Patent No.: US 6,527,976 B1
(45) Date of Patent: Mar. 4, 2003

(54) EPOXY-, MELAMINE- AND ISOCYANATE CURED OXYGEN SCAVENGING COMPOSITIONS AND METHODS OF PREPARING THE SAME

(75) Inventors: Gangfeng Cai, Danville, CA (US); Ta Yen Ching, Novato, CA (US); Hu Yang, San Ramon, CA (US)

(73) Assignee: Chenron Phillips Chemical Company LP, Houston, TX (US)

( * ) Notice: Subject to any disclaimer, the term of this patent is extended or adjusted under 35 U.S.C. 154(b) by 153 days.

(21) Appl. No.: 09/722,373

(22) Filed: Nov. 27, 2000

(51) Int. Cl.$^7$ .................................................. C08K 5/00
(52) U.S. Cl. ........................ 252/188.28; 428/35.1; 428/35.5; 428/35.6; 428/35.7
(58) Field of Search .......................... 428/35.9, 35.7, 428/36.7, 479.6; 252/188.28, 188.1, 397; 229/100; 502/159; 526/308, 348; 427/35.7, 35.8, 35.9, 349, 516, 35.2, 35.3

(56) References Cited

U.S. PATENT DOCUMENTS

| | | | |
|---|---|---|---|
| 3,497,571 A | 2/1970 | Tellier et al. | 260/844 |
| 3,536,687 A | 10/1970 | Nordstrom | 260/89.5 |
| 4,415,710 A | 11/1983 | Barnabeo et al. | 525/370 |
| 4,524,201 A | 6/1985 | Barnabeo et al. | 528/395 |
| 4,694,029 A | 9/1987 | Land | 522/8 |
| 4,877,455 A * | 10/1989 | Brauer et al. | 106/243 |
| 5,116,916 A | 5/1992 | Young | 525/350 |
| 5,211,875 A | 5/1993 | Speer et al. | 252/188.28 |
| 5,212,210 A | 5/1993 | Halm | 522/24 |
| 5,346,644 A | 9/1994 | Speer et al. | 252/188.28 |
| 5,425,896 A | 6/1995 | Speer et al. | 252/188.28 |
| 5,466,756 A | 11/1995 | Roach et al. | 525/330.6 |
| 5,498,364 A | 3/1996 | Speer et al. | 252/188.28 |
| 5,627,239 A | 5/1997 | Ching et al. | 525/330.6 |
| 5,641,825 A | 6/1997 | Bacskai et al. | 524/398 |
| 5,656,692 A | 8/1997 | Hayes | 525/63 |
| 5,660,761 A | 8/1997 | Katsumoto et al. | 252/188.28 |
| 5,700,554 A | 12/1997 | Speer et al. | 428/220 |
| 5,736,616 A | 4/1998 | Ching et al. | 525/330.3 |
| 5,776,361 A | 7/1998 | Katsumoto et al. | 252/188.28 |
| 5,837,158 A | 11/1998 | Sheppodd et al. | 252/181.6 |
| 5,859,145 A | 1/1999 | Ching et al. | 525/330.6 |
| 5,885,481 A | 3/1999 | Venkateshwaran et al. | 252/188.28 |
| 6,020,455 A | 2/2000 | Pretzer et al. | 528/307 |
| 6,057,013 A | 5/2000 | Ching et al. | 428/35.7 |
| 6,063,307 A | 5/2000 | Shepodd et al. | 252/181.6 |
| 6,254,803 B1 * | 7/2001 | Matthews et al. | 252/188.1 |
| 6,255,248 B1 * | 7/2001 | Bansleben et al. | 252/188.28 |
| 6,333,087 B1 * | 12/2001 | Jerdee et al. | 229/100 |

FOREIGN PATENT DOCUMENTS

| | | |
|---|---|---|
| DE | 1900181 | 10/1969 |
| EP | 0 418 011 A2 | 3/1991 |
| EP | 0 927 218 B1 | 4/2000 |
| WO | WO99/15433 | 4/1999 |
| WO | WO99/48963 | 9/1999 |

OTHER PUBLICATIONS

Ching et al., "Tasteless Oxygen Scavenging Polymers: A New Platform Technology for Food Packaging Based On Controlled Oxidation," *Oxygen Absorber . . . 2001 and Beyond*, OSP Conference, pp. 1–8 (Chicago, Jun. 19–20, 2000).

Ching et al., "Tasteless Oxygen Scavenging Polymers: A New Platform Technology for Food Packaging Based On Controlled Oxidation," *Oxygen Absorber . . . 2001 and Beyond*, OSP Conference Slides (Chicago, Jun. 19–20, 2000).

* cited by examiner

Primary Examiner—Steven Bos
Assistant Examiner—Anthony Kuhar
(74) Attorney, Agent, or Firm—Williams, Morgan and Amerson (57) ABSTRACT

An oxygen scavenging composition that can be either thermoplastic or thermoset, and that comprises at least one oxygen scavenging polymer and at least one curing agent is disclosed. The oxygen scavenging polymer comprises a polymeric backbone, at least two curing functional groups that are terminal groups and at least one oxygen scavenging cyclic moiety having from 5 to 9 carbon atoms in its ring and at least one carbon-carbon double bond in its ring. The curing functional groups of the oxygen scavenging polymer can be independently selected from hydroxyl groups, amino groups, carboxylic groups, sulfonic groups, and epoxy groups. The curing agent comprises at least two functional groups that are capable of reacting with the curing functional groups of the oxygen scavenging polymer.

68 Claims, 1 Drawing Sheet

Figure 1

EPOXY-, MELAMINE- AND ISOCYANATE CURED OXYGEN SCAVENGING COMPOSITIONS AND METHODS OF PREPARING THE SAME

BACKGROUND OF THE INVENTION

1. Field of the Invention

The present invention relates generally to the field of oxygen scavenging materials. More particularly, it concerns cured oxygen scavenging compositions and methods and components for producing the same.

2. Description of Related Art

It is well known that limiting the exposure of oxygen-sensitive products to oxygen maintains and enhances the quality and shelf-life of the product. For instance, by limiting the oxygen exposure of oxygen sensitive food products in a packaging system, the quality of the food product is maintained, and food spoilage is avoided. In addition, such packaging also keeps the product in inventory longer, thereby reducing costs incurred from waste and restocking. In the packaging industry, several means for limiting oxygen exposure have already been developed, including modified atmosphere packaging (MAP), vacuum packaging and oxygen barrier film packaging.

Another means for limiting oxygen exposure involves incorporating an oxygen scavenger into the packaging structure. Incorporation of a scavenger in the package can provide a uniform scavenging effect throughout the package. In addition, such incorporation can provide a means of intercepting and scavenging oxygen as it is passes through the walls of the package, thereby maintaining the lowest possible oxygen level throughout the package.

While much emphasis is being placed on thermoplastic oxygen scavenging compositions for use in packaging, it would also be desirable to have oxygen scavenging compositions that have a thermoset structure. Such thermoset compositions could permit oxygen scavenging technology to be used in certain contexts (e.g., coatings) in which it would be difficult to use a thermoplastic composition. Furthermore, oxygen scavenging compositions that tend to have inherent barrier properties are also desirable. It would also be beneficial to have oxygen scavenging coatings that can both protect a metal container (e.g., a can) from corrosion, while conferring oxygen scavenging benefits to the oxygen-sensitive contents of the container.

SUMMARY OF THE INVENTION

The present invention is directed to cured (e.g., thermoset and thermoplastic) oxygen scavenging compositions, oxygen scavenging polymers that can be reacted with curing agents, and methods of preparing cured oxygen scavenging coatings.

One aspect of the invention is an oxygen scavenging composition that can be either thermoplastic or thermoset, and that comprises at least one oxygen scavenging polymer and at least one curing agent. The oxygen scavenging polymer comprises a polymeric backbone, at least two curing functional groups that are terminal groups and at least one oxygen scavenging cyclic moiety having from 5 to 9 carbon atoms in its ring and at least one carbon-carbon double bond in its ring. It is preferred that the curing functional groups of the oxygen scavenging polymer be independently selected from hydroxyl groups, amino groups, carboxylic groups, sulfonic groups, and epoxy groups. The curing agent comprises at least two functional groups that are capable of reacting with the curing functional groups of the oxygen scavenging polymer.

Examples of curing agents that can be employed include melamine crosslinkers, isocyanate crosslinkers, and epoxy crosslinkers. Different curing functional groups are preferred for use with different curing agents, and this is one factor that is considered in selecting useful combinations of curing agents and oxygen scavenging polymers for oxygen scavenging compositions (both thermoplastic or thermoset) of the present invention. For example, isocyanate and melamine crosslinkers can be used to link or crosslink oxygen scavenging polymers that have pendant or terminal hydroxyl groups (e.g., diols). Furthermore, epoxy and melamine crosslinkers can be used to link or crosslink oxygen scavenging polymers that have terminal or pendant acid groups (e.g., carboxylic groups). Furthermore, isocyanate and epoxy crosslinkers can be used in embodiments of the present invention that are either thermoset or thermoplastic. Melamine crosslinkers can be used in thermoset (e.g., crosslinked) cured oxygen scavenging compositions of the present invention.

The present invention involves linkages (e.g., crosslinks in the case of thermoset compositions) between at least the ends (e.g., termini) of separate oxygen scavenging polymer molecules. Furthermore it is preferred that oxygen scavenging carried out by compositions of the present invention is such that the chemical reaction does not result in the cleavage of the backbone of the crosslinked oxygen scavenging polymer, or in the release of compounds that can have undesirable organoleptic effects. Furthermore, the composition can be in the form of a coating or an adhesive.

Another aspect of the invention is a method of preparing a solvent based oxygen scavenging coating that is thermoset (e.g., crosslinked). A coating solution is prepared comprising at least one oxygen scavenging polymer and at least one curing agent. Both the polymer and curing agent are as described above. The polymer and the agent must have functional groups that are capable of reacting with one another. In certain cases, when neither the curing agent, nor the polymer is a low viscosity liquid, the coating solution also comprises a solvent. The coating solution is applied to a surface and is then cured to produce a thermoset coating. In certain embodiments in which the coating solution further comprises an oxygen scavenging initiator, the method can further comprise initiating oxygen scavenging.

Yet another aspect of the invention is a method of preparing a solventless based oxygen scavenging coating. A blend comprising at least one oxygen scavenging polymer and at least one solid curing agent (e.g., solid melamine or epoxy crosslinkers) is prepared. Furthermore, the oxygen scavenging polymer of the blend comprises at least two curing functional groups that are terminal groups and at least one cyclic organic moiety, as described above. It is preferred that the oxygen scavenging polymer used in the blend have a $T_g$ of about 40° C. to about 80° C. The solid curing agent of the blend comprises at least two functional groups as described above that are reactive with the curing functional groups of the oxygen scavenging polymer. After its preparation, the blend is ground to a powder. This powder is applied to a surface, and then cured. In certain embodiments, the method can further comprise initiating oxygen scavenging.

Still another aspect of the invention is an oxygen scavenging composition comprised of at least one type of cured oxygen scavenging polymer. The composition can be either thermoplastic or thermoset. The crosslinked oxygen scavenging polymer comprises a polymeric backbone, at least one oxygen scavenging cyclic moiety having from 5 to 9 carbon atoms and at least one carbon-carbon double bond in its ring. The crosslinked polymer is the product of a reaction of at least one low molecular weight oxygen scavenging polymer and at least one curing agent. The curing agent is as described above. The low molecular weight oxygen scavenging polymer comprises a polymeric backbone, at least two curing functional groups that are terminal groups and at least one oxygen scavenging cyclic moiety having from 5 to 9 carbon atoms in its ring and at least one carbon-carbon double bond in its ring, that is the same as the oxygen scavenging cyclic moiety of the crosslinked polymer. The composition can further comprise one or more additional components, as described above. Furthermore, compositions of this embodiment can be either solvent based or solventless based oxygen scavenging compositions.

Another aspect of the invention is an oxygen scavenging polymer, capable of being crosslinked having curing functional groups that are carboxylic groups or hydroxyl groups, and that is the product of a reaction comprising cis-1,2,3,6-tetrahydrophthalic anhydride and at least one diol. The reaction can further comprise at least one polyol (e.g., triol). Addition of small amounts of a triol or other polyol can be used in the reaction to produce a highly branched polyester. This oxygen scavenging polymer comprises a polymeric backbone and at least two curing functional groups that are terminal groups. It has a number average molecular weight between about 500 Mn and about 5000 Mn. Furthermore, the oxygen scavenging polymer comprises at least one oxygen scavenging cyclic moiety derived from cis-1,2,3,6-tetrahydrophthalic anhydride having a particular configuration of formula (IV), described below, wherein h is 1, j is 0, $q_{10}$, $q_{11}$, $q_{12}$, $q_{13}$, r", $R_9$, and $R_{10}$ are H. The oxygen scavenging polymer can further comprise at least one oxygen scavenging cyclic moiety derived from an alcohol that has a formula selected from formula (I), (II), (III), and (IV), described below in more detail. Preferably between about 2 and 16 wt % of the total —CH=CH— units in the oxygen scavenging polymer are those present in the oxygen scavenging cyclic moieties (e.g., having formula (I), (II), (III), or (IV), while the remainder of the —CH=CH— units are present in the polymeric backbone of the low molecular weight oxygen scavenging polymer.

Certain of the oxygen scavenging compositions of the present invention are thermoset and are therefore useful in certain contexts in which thermoplastic compositions have limited utility. For example, certain thermoset compositions of the present invention can be used as adhesives to join articles or layers together. They can also be particularly useful as coatings for metal containers (e.g., cans).

Certain ordinary (e.g., non-oxygen scavenging) thermoset compositions can be used to treat the surface of a can or a squeezable tube to protect it from corrosion. Corrosion of a metal food can can cause food contained in it to take on an unpleasant flavor. Metal corrosion can be a particular problem with certain foods that are relatively reactive with metal and that are packaged in metal cans (e.g., carbonated beverages and acidic juices). When certain compositions of the present invention are applied to the inner surfaces of cans, they can help prevent the metal from being corroded, while providing the capacity to scavenge oxygen, thus helping to preserve the oxygen sensitive goods in the container and prolonging their potential shelf life. Certain compositions of the present invention can also be applied to the inner surfaces of squeezable tubes, such as those used for packaging paints, toothpastes, pharmaceuticals and cosmetics. Such squeezable tubes can be made from metal, plastic or paper. Increasing a good's shelf life can provide cost savings, in reducing the need to restock and in decreasing waste. Certain compositions of the present invention could also be used to in the field of electronics to protect oxygen sensitive electronic components.

A general advantage of thermoset materials is that they tend to inherently possess good barrier properties (e.g., gas barrier and moisture barrier properties), and thermoset compositions of the present invention have enhanced barrier properties, because of their added ability to scavenge oxygen.

BRIEF DESCRIPTION OF THE DRAWINGS

The following drawing forms part of the present specification and is included to further demonstrate certain aspects of the present invention. The invention may be better understood by reference to this drawing in combination with the detailed description of specific embodiments presented herein.

DESCRIPTION OF ILLUSTRATIVE EMBODIMENTS

In the present invention, crosslinked compositions are thermoset, and cured compositions can be either thermoplastic or thermoset. In cases where a polymer that has only two curing functional groups is reacted with a curing agent having only two functional groups (e.g., epoxy crosslinkers and isocyanate crosslinkers), the cured composition can be thermoplastic.

I. The Oxygen Scavenging Polymer

Certain embodiments of the present invention are directed to oxygen scavenging compositions that comprise at least one oxygen scavenging polymer and at least one curing agent. "At least one oxygen scavenging polymer" includes a plurality of oxygen scavenging polymeric molecules that comprises a single type of polymer molecule or that comprises a mixture of different polymer molecules. Individual oxygen scavenging polymeric molecules of the "at least one oxygen scavenging polymer" comprise a polymeric backbone and at least two curing functional groups that are terminal groups. Curing functional groups whether terminal (e.g., at ends of the polymeric molecule) or pendant are groups that are capable of reacting with functional groups of a curing agent to form a linkage or crosslink. The oxygen scavenging polymer also comprises at least one oxygen scavenging cyclic moiety that has 5 to 9 ring carbon atoms and at least one carbon-carbon double bond in its ring.

The polymeric backbone can be a polyester. The backbone can be fully saturated, or the backbone can comprise at least one unsaturated bond. Preferably the oxygen scavenging polymer has a number average molecular weight of less than about 5000 Mn, more preferably it has a number average molecular weight of between about 500 Mn and about 5000 Mn.

The oxygen scavenging cyclic moiety of the oxygen scavenging polymer can be alicyclic or aromatic, preferably the ring is cycloalkenyl. Furthermore, at least one carbon in the ring of the oxygen scavenging cyclic moiety can be part of the polymeric backbone, or the oxygen scavenging cyclic moiety can be pendant to the backbone. When at least one carbon of the cyclic organic moiety's ring is part of the backbone, the oxygen scavenging cyclic moiety will preferably have a formula selected from formula (III) and (IV)

Formula (III)

wherein A is —$(CR_5R_6)_g$—, g is an integer from 0 to 3, inclusive; wherein E is —$(CR_7R_8)_p$—, p is an integer from 0 to 3, inclusive; g+p≦3; wherein $q_6$, $q_7$, $q_8$, $q_9$, r', each $R_5$, each $R_6$, each $R_7$, and each $R_8$ are independently selected from hydrogen, linear $C_1$–$C_{20}$ alkyls, branched $C_1$–$C_{20}$ alkyls, cyclic $C_1$–$C_{20}$ alkyls, polycyclic $C_1$–$C_{20}$ alkyls, aromatic groups, halogens, and sulfur-containing substituents, and when r' is hydrogen, at least one of $q_6$, $q_7$, $q_8$, and $q_9$ is hydrogen. Preferably $q_6$, $q_7$, $q_8$, $q_9$, r', each $R_5$, each $R_6$, each $R_7$, and each $R_8$ are independently selected hydrogen, methyl, and ethyl.

Formula (IV)

wherein m is —$(CR_9R_{10})_h(CR_{11}R_{12})_j$—, wherein the ring carbon adjacent to the double bond is bonded to $R_9$ and $R_{10}$, h is an integer from 0 to 1, inclusive, j is an integer from 0 to 3, inclusive, and when h+j≧1, h is 1; wherein $q_{10}$, $q_{11}$, $q_{12}$, $q_{13}$, r", $R_9$, $R_{10}$, each $R_{11}$, and each $R_{12}$ are independently selected hydrogen, linear $C_1$–$C_{20}$ alkyls, branched $C_1$–$C_{20}$ alkyls, cyclic $C_1$–$C_{20}$ alkyls, polycyclic $C_1$–$C_{20}$ alkyls, aromatic groups, halogens, and sulfur-containing substituents; and wherein when r" is hydrogen, at least one of $q_{10}$, $q_{11}$, $R_9$, and $R_{10}$ is hydrogen. It is preferred that $q_{10}$, $q_{11}$, $q_{12}$, $q_{13}$, r", $R_9$, $R_{10}$ each $R_{11}$, and each $R_{12}$ are independently selected from H, methyl, and ethyl.

In other embodiments, the oxygen scavenging cyclic moiety can have the formula (V), below:

(V)

wherein g is —$(CR_{13}R_{14})_a$—, wherein a is an integer from 0 to 4, inclusive; wherein $q_{14}$, $q_{15}$, $q_{16}$, $q_{17}$, r''', each $R_{13}$, and each $R_{14}$ are independently selected from hydrogen, linear $C_1$–$C_{20}$ alkyls, branched $C_1$–$C_{20}$ alkyls, cyclic $C_1$–$C_{20}$ alkyls, polycyclic $C_1$–$C_{20}$ alkyls, aromatic groups, halogens, and sulfur-containing substituents; and wherein when r''' is hydrogen at least one of $q_{16}$, and $q_{17}$ is hydrogen. Preferably, $q_{14}$, $q_{15}$, $q_{16}$, $q_{17}$, r''', each $R_{13}$, and each $R_{14}$ are independently selected from H, methyl, and ethyl.

When the oxygen scavenging cyclic moiety is pendant to the polymeric backbone it can have the formula (I).

Formula (I)

wherein Q is —$(CR_2R_3)_n$—, n is an integer from 0 to 3, inclusive; wherein Z is —$(CR_4R_5)_e$—, e is an integer from 0 to 3, inclusive; n+e≦3; wherein $q_0$, $q_1$, $q_2$, $q_3$, $q_4$, r, each $R_2$, each $R_3$, each R4, and each $R_5$ are independently selected from hydrogen, linear $C_1$–$C_{20}$ alkyls, branched $C_1$–$C_{20}$ alkyls, cyclic $C_1$–$C_{20}$ alkyls, polycyclic $C_1$–$C_{20}$ alkyls, aromatic groups, halogens, and sulfur-containing substituents, and when r is hydrogen at least one of $q_1$, $q_2$, $q_3$, and $q_4$ is hydrogen. Preferably $q_0$, $q_1$, $q_2$, $q_3$, $q_4$, r, each $R_2$, each $R_3$, each $R_4$, and each $R_5$ are independently selected from hydrogen, methyl, or ethyl.

Alternatively, the pendant oxygen scavenging cyclic moiety can have the formula (II).

(II)

wherein $r_1$, $r_2$, $r_3$, $r_4$, and $r_5$ are independently selected from hydrogen, linear $C_1$–$C_{20}$ alkyls, branched $C_1$–$C_{20}$ alkyls, cyclic $C_1$–$C_{20}$ alkyls, polycyclic $C_1$–$C_{20}$ alkyls, aromatic groups, halogens, and sulfur-containing substituents. Preferably, $r_1$, $r_2$, $r_3$, $r_4$, and $r_5$ are independently selected from hydrogen, methyl, or ethyl.

Oxygen scavenging polymers that comprise a pendant oxygen scavenging cyclic moiety can further comprise a linking group linking the polymeric backbone and the pendant cyclic organic moiety. The linking group can be selected from the following group: $C_1$–$C_{12}$ alkyls, substituted $C_1$–$C_{12}$ alkyls, $C_1$–$C_{12}$ esters, $C_1$–$C_{12}$ ethers, $C_1$–$C_{12}$ silicones, and linking groups with the formula —$(CH_2)_z$—M—$(CH_2)_m$—. (M is a moiety comprising oxygen, nitrogen, sulfur, silicon, or any combination thereof. z is an integer from 0 to 12, inclusive, and m is an integer from 0 to 12, inclusive, and when one of z or m is 0, the other is at least 1.)

Preferably the linking group is selected from the group consisting of

—O—$(CHR_O)_n$—; —(C=O)—O—$(CHR_O)_n$—; —NH—$(CHR_O)_n$—; —O—(C=O)—$(CHR_O)_n$—; —(C=O)—NH—$(CHR_O)_n$—; and —(C=O)—O—CHOH—$CH_2$—O—;

wherein $R_O$ is hydrogen, methyl, ethyl, propyl, or butyl; and n is an integer from 1 to 12, inclusive.

The oxygen scavenging polymer also comprises at least two curing functional groups that are terminal groups, and that are capable of reacting with functional groups of a curing agent. Reaction of the functional groups belonging to the polymer and the curing agent results in a cured product. When both the polymer and the curing agent have at least two functional groups, and at least one of the polymer and the curing agent has more than two functional groups, the cured composition can be thermoset (e.g. crosslinked). Preferred curing functional groups of the oxygen scavenging polymer include hydroxyl groups, amino groups, carboxylic groups, sulfonic groups, and epoxy groups, among others. In certain embodiments the oxygen scavenging polymer can comprise pendant curing functional groups in addition to its terminal curing functional groups. Such polymers with pendant functional groups are preferred in thermoset compositions of the present invention. Preferably the curing functional groups are positioned along the backbone such that their reaction with the groups of the curing agent, results in linkages (e.g., crosslinks when the composition is thermoset) between the polymeric backbones, such that substantially all of the oxygen scavenging cyclic moieties are not directly involved in the curing reaction. Particularly preferred classes of oxygen scavenging polymers are hydroxyl terminated polyesters, and carboxylic group terminated polyesters, among others.

The preferred acid number and hydroxyl number for the oxygen scavenging polymer depends on the crosslinker that is being used in preparing the cured composition. For example, in the case of a hydroxyl terminated polyester that is cured using an isocyanate crosslinker, the acid number of the hydroxyl terminated polyester is preferably about 5 mg KOH/g or less and the hydroxyl number of the oxygen scavenging polymer is preferably between about 22.5 and 225 mg KOH/g. In this case, the hydroxyl number of the hydroxyl terminated polyester correlates to a polymer with an Mn of between about 5000 and 500 Mn. In the case of a —COOH (e.g., acid) terminated polyester that is cured with an epoxy crosslinker, the acid number of the polyester is preferably between about 22.5 and 225 mg KOH/g (which corresponds to a Mn range of between about 5000 and 500). The relationship of molecular weight of a diacid (e.g., carboxylic) terminated polyester to its acid number can be expressed in terms of the following equation:

Acid Number of the diacid terminated polymer=(2×1000 mg/g× 56.1 g/mol KOH)/molecular weight of the polymer in grams The factor of 2 in the equation is for the two acids (e.g., carboxylic groups) of the diacid. The relationship of molecular weight of a dihydroxyl terminated polyester to its hydroxyl number can be expressed in terms of the following equation:

Hydroxyl Number of the dihydroxyl terminated polymer=(2×1000 mg/g×56.1 g/mol KOH)/molecular weight of the polymer in grams.

This relationship is similar to the molecular weight to acid number of diacid terminated polymer.

One particular oxygen scavenging polymer of the present invention that is capable of being cured, is the product of a reaction comprising cis-1,2,3,6-tetrahydrophthalic anhydride and at least one diol, as described above. In certain embodiments, the reaction can further comprise a polyol (e.g., a triol) to produce a more highly branched polymer product. This oxygen scavenging polymer comprises a polymeric backbone and at least two curing functional groups that are terminal groups, (e.g., acid groups more particularly carboxylic acid groups) and has a number average molecular weight between about 500 Mn and about 5000 Mn. Furthermore, such an oxygen scavenging polymer comprises at least one oxygen scavenging cyclic moiety having the formula (IV) wherein h is 1, j is 0, $q_{10}$, $q_{11}$, $q_{12}$, $q_{13}$, r″, $R_9$, $R_{10}$, are H; and wherein the oxygen scavenging cyclic moiety is derived from cis-1,2,3,6-tetrahydrophthalic anhydride. Such an oxygen scavenging polymer can further comprise oxygen scavenging cyclic moieties that are derived from the diol and such additional cyclic moieties can have a formula selected from formula (I), (II), (III), (IV) and (V), described above. Preferably between about 2 and 16 wt % of the total —CH=CH— units in the oxygen scavenging polymer are those present in the oxygen scavenging cyclic moieties having formulas (I), (II), (III), (IV) or (V), while the remainder of the —CH=CH— units are present in the polymeric backbone of the oxygen scavenging polymer.

Formulas (I), (II), (III) and (IV) are preferred formulas for additional oxygen scavenging cyclic moieties in this oxygen scavenging polymer, and formula (I) is particularly preferred. When the oxygen scavenging cyclic moiety has formula (I) or (II), the oxygen scavenging polymer can further comprise a linking group, linking the pendant oxygen scavenging cyclic moiety to the backbone, as described above. In certain embodiments the oxygen scavenging polymer can be produced from a reaction comprising maleic anhydride in addition to the cis-1,2,3,6-tetrahydrophthalic anhydride and the diol.

Figure 1:
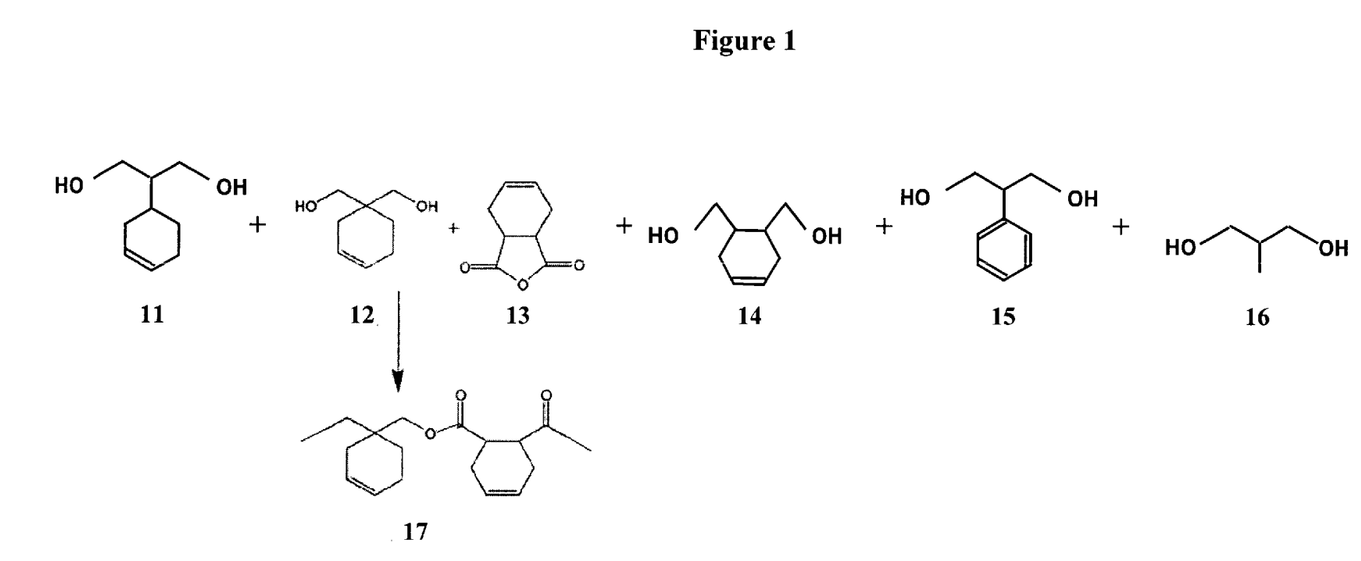
FIG. 1 shows a synthesis scheme for a particular oxygen scavenging polymer of the present invention.

FIG. 1 shows one possible synthesis of an oxygen scavenging polymer of the present invention comprising cis-1, 2,3,6-tetrahydrophthalic anhydride 13 and diols. Cis-1,2,3, 6-tetrahydrophthalic anhydride 13 and diols are reacted to form an oxygen scavenging polyester 17. Diols that can be used include 2-cyclohex-3-enyl-propane-1,3-diol 11, 3-cyclohexene-1,1-dimethanol 12, (6-hydroxymethyl-cyclohex-3-enyl)-methanol 14, 2-phenyl-propane-1,3-diol 15, and 2-methyl-1,3-propanediol 16, among others. A reaction product 17 of cis-1,2,3,6-tetrahydrophthalic anhydride 13 and 3-cyclohexene-1,1-dimethanol 12 is shown. Preferably, a curing reaction comprising an oxygen scavenging polyester is carried out at a temperature of between about 180° C. and about 260° C. for between about 4 and 24 hours. A vacuum of between about −100 and −1 mmHg can be applied at the end of the reaction to drive the reaction to completion.

Examples of diols that can be used in preparing the oxygen scavenging polymer include 1,2-propanediol, phenylmethanediol, phenylethanediol, 3-cyclohexene-1-methanediol, 3-cyclohexene-1-ethanediol, 4-cyclohexene-1, 2-diol, and 3-cyclohexene-1, 1-dimethanol, among others, and 3-cyclohexene-1, 1-dimethanol is preferred.

The oxygen scavenging polymer and curing agent used in producing cured compositions of the present invention should be selected (1) to be compatible for reaction with each other (e.g., comprise functional groups that can be reacted to produce a cured composition) and (2) to yield the desired characteristics in the cured composition that support its intended function.

II. Curing Agents

Certain classes of crosslinkers can be used as curing agents in the present invention. In thermoset compositions the functional groups of crosslinkers react with two or more polymeric molecules to form crosslinks, while in thermoplastic compositions the functional groups of the crosslinker form linkages between only the ends of two polymeric molecules. In preparing cured compositions of the present invention, "at least one curing agent" includes a plurality of crosslinkers, wherein the plurality can comprise a single type of crosslinker or a mixture of more than one type of crosslinker. The crosslinkers comprise at least two functional groups that are capable of reacting with the at least two curing functional groups of the oxygen scavenging polymeric.

It is preferred that the curing agent used in certain embodiments of the present invention comprise at least one crosslinker from the following group: melamine crosslinkers, isocyanate crosslinkers, and epoxy crosslinkers.

Melamines generally have more than two functional groups that can react with the curing functional groups of the polymer, and thus cured compositions of the present invention comprising melamine crosslinkers are crosslinked (e.g., thermoset). Melamine crosslinker can be selected from the group consisting of amino or melamine curing agents, such as hexakis(methoxymethylol)-melamine (Cymel 303, product of Cytec). Melamine crosslinkers comprise amino functional groups. In a melamine crosslinked composition, it is preferred that the oxygen scavenging polymer comprises curing functional groups independently selected from carboxylic groups and hydroxyl groups. Preferably an oxygen scavenging polymer used in a composition with a melamine crosslinker, will have a number average molecular weight between about 500 Mn and 5000 Mn, and if the polymer is hydroxyl terminated, it will have a hydroxyl number of between about 22.5 and 225 mg KOH/g. If the polymer is acid terminated (e.g., carboxylic terminated) then it is preferred that it have an acid number between about 22.5 and 225 mg KOH/g. When the polymer that is crosslinked by the melamine has hydroxyl curing functional groups, it is preferred that the polymer have an acid number less than about 10 mg KOH/g, but polymers with higher acid numbers can be used in certain embodiments. It is preferred that an oxygen scavenging polymer that is used in a crosslinked composition with a melamine crosslinker comprise a polyol or a polyester, particularly a polymer selected from the group consisting of hydroxyl terminated polyesters, hydroxyl terminated polyols, and acid group terminated polyesters (e.g., carboxylic acid group terminated polyesters). The oxygen scavenging polymer described above that is the product of reaction comprising at least one diol and cis-1,2,3,6-tetrahydrophthalic anhydride is one example of an oxygen scavenging polymer that is preferred for use with the melamine crosslinkers. The oxygen scavenging compositions that comprise melamine crosslinkers are thermoset after curing.

Melamine crosslinked oxygen scavenging compositions of the present invention can in certain embodiments further comprise a crosslinking catalyst. When a melamine crosslinker is used to crosslink hydroxyl or carboxyl terminated polymers, use of a strong acid catalyst in a concentration of between about 0.25 and 1.0 wt % of the reactants is preferred. p-Toluenesulfonic acid is a preferred strong acid catalyst.

Isocyanate crosslinkers comprise isocyanate functional groups, and can be selected from the group consisting of toluene diisocyanate (TDI), methylene bisphenyl isocyanate (MDI), isophorone diisocyanate (IPDI), tetramethylxylylene diisocyanate (TMXDI), 3,3'-dimethyl-4,4'phenylene diisocyanate (TODI), and hexamethylene-1,6-diisocyanatehexane (HDI) and aliphatic diisocyanate (ADI).

Polyisocyanates that can be used in compositions of the present invention can be aliphatic, cycloaliphatic, araliphatic, aromatic, or heterocyclic polyisocyanate, or any combination of such polyisocyanates. Particular polyisocyanates correspond to the formula Q(NCO)$_p$ in which p is an integer from 2 to 4, inclusive, and Q represents an aliphatic hydrocarbon di-, tri-, or tetra-radical containing from 2 to 100 carbon atoms, and zero to 50 heteroatoms, a cycloaliphatic hydrocarbon radical containing from 4 to 100 carbon atoms and zero to 50 heteroatoms, an aromatic hydrocarbon radical or heterocyclic aromatic radical containing from 5 to 15 carbon atoms and zero to 10 heteroatoms, or an araliphatic hydrocarbon radical containing from 8 to 100 carbon atoms and zero to 50 heteroatoms. The heteroatoms that can be present in Q include non-peroxidic oxygen, sulfur, non-amino nitrogen, halogen, silicon, and non-phosphino phosphorus.

Some examples of polyisocyanates that can be used in certain embodiments of the present invention are as follows: ethylene diisocyanate, 1,4-tetramethylene diisocyanate, 1,6-hexamethylene diisocyanate, trimethyl hexamethylene diisocyanate, 1,12-dodecane diisocyanate, cyclobutane-1,3-diisocyanate, cyclohexane-1,3- and -1,4-diisocyanate and mixtures of these isomers, 1-isocyanato-3,3,5-trimethyl-5-isocyanatomethyl cyclohexane, 2,4- and 2,6-hexahydrotolylene diisocyanate and mixtures of these isomers, hexahydro-1,3- and/or -1,4-phenylene diisocyanate, perhydro-2,4'- and/or -4,4'-diphenylmethane diisocyanate, 1,3- and 1,4-phenylene diisocyanate, 2,4- and 2,6-tolylene diisocyanate and mixtures of these isomers, diphenylmethane-2,4'- and/or -4,4'-diisocyanate, naphthylene-1,5-diisocyanate, and the reaction products of four equivalents of the aforementioned isocyanate-containing compounds with compounds containing two isocyanate-reactive groups.

Additional examples of some classes of polyisocyanate crosslinkers that can be used in the present invention are: triphenyl methane-4,4',4"-triisocyanate, polyphenyl polymethylene polyisocyanates, m- and p-isocyanatophenyl sulphonyl isocyanates, perchlorinated aryl polyisocyanates, polyisocyanates containing carbodiimide groups, norbornane diisocyanates, polyisocyanates containing allophanate groups, polyisocyanates containing isocyanurate groups, polyisocyanates containing urethane groups, polyisocyanates containing acrylated urea groups, polyisocyanates containing biuret groups, polyisocyanates produced by telomerization, polyisocyanates containing ester groups, reaction products of the above-mentioned diisocyanates with acetals and polyisocyanates containing polymeric fatty acid esters.

Other examples of isocyanate crosslinkers that can be used in the present invention are hexamethylene diisocyanate, the biuret of hexamethylene diisocyanate and oligomers thereof (Desmodur.TM. N-100, Miles, Pittsburgh, Pa.), the isocyanurate of hexamethylene diisocyanate (Desmodur N-3300, Miles, Pittsburgh, Pa.); and 4,4'-methylenebis(cyclohexylisocyanate); 1-isocyanato-3,3,5-trimethyl-5-isocyanatomethyl cyclohexane (isophorone diisocyanate); the tolylene diisocyanates and their isocyanurates; the mixed isocyanurate of tolylene diisocyanate and hexamethylene diisocyanate; the reaction product of 1 mol of trimethylol propane and 3 mols of tolylene diisocyanate and also crude diphenyl methane diisocyanate.

Preferably the oxygen scavenging polymer that is reacted with the isocyanate crosslinker to produce a cured composition comprises curing functional groups independently selected from carboxylic groups and hydroxyl groups. Preferably, the oxygen scavenging polymer of the isocyanate cured composition has a number average molecular weight between about 500 Mn and about 5000 Mn, and an acid number of less than about 5 mg KOH/g, more preferably an acid number less than about 2 mg KOH/g. The oxygen scavenging polymer can be a polyol or polyester. Preferably it is selected from the group consisting of hydroxyl terminated polyesters, hydroxyl terminated polyols, and acid group terminated polyesters (e.g., carboxylic acid group terminated polyesters). Again, the oxygen scavenging polymer described above that is the product of a reaction comprising at least one diol and cis-1,2,3,6-tetrahydrophthalic anhydride is suitable for use with the isocyanate crosslinkers. Furthermore, preferably the curing reaction comprises an hydroxyl group/isocyanate group ratio of between about 0.9 and 1.10. The curing reaction is actually done with the addition of small amount (1–5 wt .%) of a multifunctional crosslinker (such as triol and polyols). In most cases, the polyester has on average between 2 and 3 curing functional groups (e.g., each polymer has more than two —OH groups). If the polyester is difunctional (e.g., having only two curing functional groups), then a triol or polyol is needed to build the crosslinking network for a thermoset composition.

In certain embodiments of the present invention that comprise isocyanate crosslinkers, it can be desirable, though not essential, to include a catalyst (e.g., an amine compound, such dimethyl aniline) to catalyze the reaction of the isocyanate with the hydroxyl terminated oxygen scavenging polymer.

Isocyanate cured compositions can be thermoplastic or thermoset, and this depends on the number of linkages between polymeric backbones per polymer molecule. Thermoplastic compositions preferably comprise oxygen scavenging polymers having only two curing functional groups that are preferably terminal groups (e.g., hydroxyl groups) and isocyanate curing agents having only two functional groups capable of reacting with the curing functional groups. Thermoset compositions are highly crosslinked (e.g., greater than 2 linkages between polymeric backbones per polymer molecule). Generally, the higher the degree of crosslinking, the more rigid the cured material becomes. Thermoset isocyanate crosslinked compositions of the present invention can be solvent based coatings or solventless based coatings.

Isocyanate cured compositions that are made by reacting isocyanate crosslinkers with alcohols are referred to as urethanes or polyurethanes. Urethane thermosets tend to have good chemical and stain resistance, and are generally tough, durable and corrosion resistant, and have the advantage that they require little or no heat to cure.

Certain epoxy crosslinkers can also be used in cured compositions of the present invention, and such compositions can be either thermoplastic or thermoset. Preferably, the epoxy crosslinker is selected from the group consisting of diglycidyl ether of bisphenol A and aliphatic epoxy (e.g., 3,4-epoxycyclohexylmethyl 3,4-epoxycyclohexanecarboxylate). Epoxy functional groups can react to form crosslinks with curing functional groups of the oxygen scavenging polymer that are acid groups (e.g., carboxylic groups). In certain embodiments a reaction catalyst, such as an amine catalyst (e.g., dimethyl aniline), can be used to facilitate the curing reaction (e.g., crosslinking in thermoset compositions). In certain epoxy curing embodiments, it is preferred that the oxygen scavenging polymer be a polyester. Preferably the oxygen scavenging polymer used with the oxygen scavenging epoxy is an acid group terminated polymer (e.g., carboxylic group terminated polyester). One preferred polymer is the type described above that is the product of a reaction comprising cis-1,2,3,6-tetrahydrophthalic anhydride and at least one diol. Preferably the polymer cured by an epoxy crosslinker has an Mn between about 500 and 5000, and an acid number of between about 22.5 and about 225 mg KOH/g. Thermoplastic cured compositions preferably comprise oxygen scavenging polymers having only two curing functional groups that are preferably terminal groups (e.g., hydroxyl groups) and epoxy crosslinkers having only two functional groups capable of reacting with the curing functional groups. Thermoset compositions are more highly crosslinked. Generally, the higher the degree of crosslinking, the more rigid the cured material becomes. Thermoset epoxy crosslinked oxygen scavenging compositions can be solvent based coatings or solventless based coatings.

Thermoset epoxies provide excellent water and chemical resistance. They have better adhesion to metal substrates than certain other coating compositions. Epoxy coatings also provide economic advantages over certain other coating materials, because they tend to be more effective against corrosion in thinner films than other materials. They can also be used as primers under other coatings that have good barrier properties but marginal adhesive characteristics.

Examples of epoxy crosslinkers that can be used in the present invention are organic compounds that have an oxirane ring, polymerizable by ring opening including: monomeric epoxy compounds and epoxides of the polymeric type and those can be aliphatic, cycloaliphatic or aromatic. They can also be mixed types. The epoxy crosslinkers generally have, on average, at least one polymerizable epoxy group per molecule, and preferably two or more epoxy groups per molecule.

Polymeric epoxides can be linear polymers having terminal epoxy groups (e.g., diglycidyl ether of a polyoxyalkylene glycol), polymers having oxirane units in their backbone (e.g., polybutadiene polyepoxide), or polymers with pendant epoxy groups (e.g., glycidyl methacrylate polymer or copolymer). Mixtures of epoxy crosslinkers can be used in certain embodiments of the present invention.

Useful epoxy crosslinkers include those, which contain cyclohexane oxide groups such as the epoxycyclohexanecarboxylates. Examples of epoxycyclohexane-carboxylates are 3,4-epoxycyclohexylmethyl-3,4 epoxycyclohexane carboxylate, 3,4-epoxy-2-methylcyclohexylmethyl-3,4-epoxy-2-methylcyclohexane carboxylate, bis(3,4-epoxy-6-methylcyclohexylmethyl)adipate, bis(3,4-epoxycyclohexyl) adipate and 2(3,4-epoxycyclohexyl-5,5-spiro-3,4 epoxy) cyclohexane-meta dioxane.

Further epoxy crosslinkers which are also useful in the present invention include glycidyl ether monomers of the formula wherein R' is alkyl or aryl, and n is an integer of 1 to 6. The glycidyl ethers of polyhydric phenols obtained by reacting a polyhydric phenol with an excess of chlorohydrin such as epichlorohydrin (e.g., the diglycidyl ether of 2,2-bis-(2,3-epoxypropoxyphenol)-propane) are examples.

Commercially available epoxy crosslinkers that can be employed in the present invention include, octadecylene oxide, dioxane, epichlorohydrin, styrene oxide, vinylcyclohexene oxide, glycidol, glycidylmethacrylate, diglycidyl ether of bisphenol A, e.g., those available under the trade designations "Epon 828", "Epon 1004"and "Epon 1010", "DER-331", "DER-332"and "DER-334", vinylcyclohexane dioxide (e.g., "ERL-4206"), 3,4-epoxycyclohexyl-methyl-3,4-epoxycyclohexane carboxylate (e.g., "ERL-4221"), 3,4-epoxy-6-methylcyclohexylmethyl-3,4-epoxy-6-methylcyclohexene-carboxylate (e.g., "ERL-4201"), bis(3, 4-epoxy-6-methylcyclo-hexylmethyl)adipate (e.g., "ERL-4289"), bis(2,3-epoxycyclopentyl)ether (e.g., "ERL-0400"), aliphatic epoxy modified with propylene glycol (e.g., "ERL-4050"and "ERL-4052"), dipentene dioxide (e.g., "ERL-4269"), epoxidized polybutadiene (e.g., "Oxiron 2001 "), silicone resin containing epoxy functionality, epoxy silanes (e.g., beta-(3,4-epoxy cyclohexyl)ethyltrimethoxy silane and gamma-glycidoxypropyltrimethoxy silane), flame retardant epoxy resins (e.g., "DER-580"), a brominated bisphenol type epoxy resin, 1,4-butanediol diglycidyl ether (e.g., "Araldite RD-2"), polyglycidyl ether of phenolformaldehyde novolak (e.g., "DEN-431"and "DEN-438") and resorcinol diglycidyl ether (e.g., "Kopoxite")."

III. The Cured Composition

In addition to the oxygen scavenging polymer and the curing agent, cured compositions of the present invention can comprise at least one material selected from the following group: pigments, oxygen scavenging initiators, antioxidants, reaction catalysts (e.g., crosslinking catalysts), low molecular weight alcohols (e.g., monohydric alcohols or diols) and transition metal catalysts.

Preferably oxygen scavenging cured compositions of the present invention comprise a transition metal catalyst. The transition metal catalyst can accelerate the rate of oxygen scavenging. Though not to be bound by theory, useful catalysts include those which can readily interconvert between at least two oxidation states. See Sheldon, R. A.; Kochi, J. K.; "Metal-Catalyzed Oxidations of Organic Compounds" Academic Press, New York 1981.

Preferably, the catalyst is in the form of a salt, with the transition metal selected from the first, second or third transition series of the Periodic Table. Suitable metals and their oxidation states include, but are not limited to, manganese II or III, iron II or III, cobalt II or III, nickel II or III, copper I or II, rhodium II, III or IV, and ruthenium. The oxidation state of the metal when introduced need not necessarily be that of the active form. The metal is preferably iron, nickel, manganese, cobalt or copper; more preferably manganese or cobalt; and most preferably cobalt. Suitable counterions for the metal include, but are not limited to, chloride, acetate, stearate, palmitate, 2-ethylhexanoate, neodecanoate and naphthenate. Preferably, the salt, the transition metal, and the counterion are either on the U.S. Food and Drug Administration GRAS (generally regarded as safe) list, or exhibit substantially no migration from the composition (i.e. less than about 50 ppb in edible dietary intake (EDI)). Particularly preferable salts include cobalt oleate, cobalt stearate, and cobalt neodecanoate. The metal salt can also be an ionomer, in which case a polymeric counterion is employed. Such ionomers are well known in the art.

Typically, the amount of transition metal catalyst can range from about 0.001 to 1% (10 to 10,000 ppm) of the oxygen scavenging polymer, based on the metal content only (excluding ligands, counterions, etc.). The transition metal catalyst can be formed in the oxygen scavenging cured composition or if the oxygen scavenging cured composition is provided in a layer, the transition metal catalyst can be formed in a layer adjacent to it.

The cured composition can further comprise an antioxidant. Antioxidants can be used with this invention to control scavenging initiation. An antioxidant as defined herein is a material, which inhibits oxidative degradation. Typically, antioxidants are added to facilitate the processing of polymeric materials or prolong their useful lifetime. In relation to this invention, such additives prolong the induction period for oxygen scavenging in the absence of initiation (by radiation exposure or heat exposure).

Antioxidants such as 2,6-di(t-butyl)-4-methylphenol (BHT), 2,2'-methylene-bis(6-t-butyl-p-cresol), triphenylphosphite, tris-(nonylphenyl)phosphite, dilaurylthiodipropionate, vitamin E, and tetra-bismethylene 3-(3,5-ditertbutyl-4-hydroxyphenyl)-propionate methane are suitable for use with this invention.

The amount of an antioxidant that can be present can also have an effect on oxygen scavenging. As mentioned earlier, such materials are usually present to prevent oxidation or gelation of the polymers. Typically, they are present in about 0.005 to 0.2% by weight. However, additional amounts of antioxidant can also be added if it is desired to tailor the induction period.

In general, oxygen scavenging compositions of the present invention will begin oxygen scavenging without deliberate action being taken to initiate oxygen scavenging. However the onset of oxygen scavenging without intervention can be days to weeks after the oxygen scavenging composition is produced. Initiation of oxygen scavenging in certain oxygen scavenging compositions can be achieved by exposure to radiation or heat. UV and/or visible light can be used with compositions that comprise photoinitiators to initiate oxygen scavenging. Similarly, exposure to microwave radiation can be used to initiate oxygen scavenging with compositions that comprise a microwave reactive material or with compositions that have been treated with a microwave reactive material. Still another method for initiating oxygen scavenging by certain cured oxygen scavenging compositions is to expose them to heat. Therefore, certain oxygen scavenging compositions of the present invention further comprise an oxygen scavenging initiator, or a blend of different oxygen scavenging initiators. Oxygen scavenging initiators can be selected from photoinitiators and microwave reactive materials. Alternatively or in addition to initiation using UV or microwave radiation, they can be treated with heat to accelerate the onset of oxygen scavenging.

Suitable photoinitiators that can be used in the present invention are known in the art. Specific examples include, but are not limited to, benzophenone, o-methoxybenzophenone, acetophenone, o-methoxyacetophenone, acenaphthenequinone, methyl ethyl ketone, valerophenone, hexanophenone, α-phenyl-butyrophenone, p-morpholinopropiophenone, dibenzosuberone, 4-morpholinobenzophenone, benzoin, benzoin methyl ether, 4-o-morpholinodeoxybenzoin, p-diacetylbenzene, 4-aminobenzophenone, 4'-methoxyacetophenone, α-tetralone, 9-acetylphenanthrene, 2-acetylphenanthrene, 10-thioxanthenone, 3-acetylphenanthrene, 3-acetylindole, 9-fluorenone, 1-indanone, 1,3,5-triacetylbenzene, thioxanthen-9-one, xanthene-9-one, 7-H-benz[de] anthracen-7-one, benzoin tetrahydropyranyl ether, 4,4'-bis (dimethylamino)-benzophenone, 1'-acetonaphthone, 2'-acetonaphthone, acetonaphthone and 2,3-butanedione, benz[a]anthracene -7,12-dione, 2,2-dimethoxy-2-phenylacetophenone, α,α-diethoxyacetophenone, and α,α-dibutoxyacetophenone, among others. Singlet oxygen generating photosensitizers such as Rose Bengal, methylene blue, and tetraphenyl porphine can also be employed as photoinitiators. Polymeric initiators include poly(ethylene carbon monoxide) and oligo[2-hydroxy-2-methyl-1-[4-(1-methylvinyl)phenyl]propanone].

One class of photoinitiators that is especially useful in certain oxygen scavenging compositions includes benzophenone derivatives containing at least two benzophenone moieties, as described in copending U.S. patent application Ser. No. 08/857,325, filed May 16, 1997, incorporated herein by reference. These compounds act as effective photoinitiators to initiate oxygen scavenging activity in oxygen scavenging compositions. Such benzophenone derivatives have a very low degree of extraction from oxygen scavenging compositions, which can lead to reduced contamination of a packaged product by extracted photoinitiator.

A "benzophenone moiety" is a substituted or unsubstituted benzophenone group. Suitable substituents include alkyl, aryl, alkoxy, phenoxy, and alicylic groups contain from 1 to 24 carbon atoms or halides.

The benzophenone derivatives include dimers, trimers, tetramers, and oligomers of benzophenones and substituted benzophenones.

The benzophenone photoinitiators are represented by the formula $X_m(Y)_n$ wherein X is a bridging group selected from sulfur; oxygen; carbonyl; —$SiR_2$—, wherein each R is individually selected from alkyl groups containing from 1 to 12 carbon atoms, aryl groups containing 6 to 12 carbon atoms, or alkoxy groups containing from 1 to 12 carbon atoms; —NR'—, wherein R' is an alkyl group containing 1 to 12 carbon atoms, an aryl group containing 6 to 12 carbon atoms, or hydrogen; or an organic group containing from 1 to 50 carbon atoms, preferably from 1 to 40 carbon atoms; m is an integer from 0 to 11; Y is a substituted or unsubstituted benzophenone group; and n is an integer from 2 to 12.

X can be a divalent group, or a polyvalent group with 3 or more benzophenone moieties. The organic group, when present, can be linear, branched, cyclic (including fused or separate cyclic groups), or an arylene group (which can be a fused or non-fused polyaryl group). The organic group can contain one or more heteroatoms, such as oxygen, nitrogen, phosphorous, silicon, or sulfur, or combinations thereof. Oxygen can is be present as an ether, ketone, ester, or alcohol.

The substituents of Y, herein R", when present, are individually selected from alkyl, aryl, alkoxy, phenoxy, or alicylic groups containing from 1 to 24 carbon atoms, or halides. Each benzophenone moiety can have from 0 to 9 substituents.

Substituents can be selected to render the photoinitiator more compatible with the oxygen scavenging composition.

Examples of such benzophenone derivatives comprising two or more benzophenone moieties include dibenzoyl biphenyl, substituted dibenzoyl biphenyl, benzoylated terphenyl, substituted benzoylated terphenyl, tribenzoyl triphenylbenzene, substituted tribenzoyl triphenylbenzene, benzoylated styrene oligomer (a mixture of compounds containing from 2 to 12 repeating styrenic groups, comprising dibenzoylated 1,1-diphenyl ethane, dibenzoylated 1,3-diphenyl propane, dibenzoylated 1-phenyl naphthalene, dibenzoylated styrene dimer, dibenzoylated styrene trimer, and tribenzoylated styrene trimer), or substituted benzoylated styrene oligomer. Tribenzoyl triphenylbenzene (BBP³) and substituted tribenzoyl triphenylbenzene are especially preferred.

Another class of photoinitiators that can be especially useful in oxygen scavenging compositions includes long-wavelength UV-absorbers. These are defined as compounds that absorb UV light and have a wavelength of maximum absorption greater than about 350 nm.

Exemplary long-wavelength UV-absorbers include, but are not limited to, 2,4,6-trimethylbenzoyldiphenylphosphine oxide (commercially available as Lucirin TPO, BASF), ethyl-2,4,6-trimethylbenzoylphenylphosphinate (Lucirin TPO-L, BASF), isopropylthioxanthone, or bis(2,4,6-trimethylbenzoyl)phenylphosphineoxide (commercially available as Irgacure 819, Ciba). Preferred long-wavelength UV-absorbers are 2,4,6-trimethylbenzoyldiphenylphosphine oxide and bis(2,4,6-trimethylbenzoyl) phenylphosphineoxide.

The primary function of a photoinitiator is to enhance and facilitate the initiation of oxygen scavenging upon exposure to UV radiation. Due to the high cost of photoinitiators, it is desirable to use the minimum amount of photoinitiator required to achieve the desired level of enhanced initiation. This minimum amount will vary depending on the photoinitiator used, the wavelength and intensity of ultraviolet light used to initiate, the nature and amount of antioxidants used, the desired scavenging rate, the temperature, and the initial oxygen concentration and other factors. Preferably, when photoinitiator is used, it is either on the U.S. Food and Drug Administration GRAS (generally regarded as safe) list, or exhibits substantially no migration from the packaging article to the product (i.e. less than about 50 ppb in EDI). The amount of photoinitiator also depends on how the scavenging component is used. For instance, if the photoinitiator-containing component is placed underneath a layer, which is somewhat opaque to, the radiation used, or is less permeable to oxygen, more photoinitiator may be needed. For most purposes, however, the amount of photoinitiator, when used, will be in the range of about 0.01 to 10% by weight of the total oxygen scavenging composition.

In certain embodiments, it can be desirable to heat the composition to initiate oxygen scavenging. Not to be bound by theory, it is thought that heating certain oxygen scavenging compositions of the present invention speeds the kinetics of the reaction that would normally lead to a slower onset of oxygen scavenging in the absence of exposure to a heat source. Thus, heating of the oxygen scavenging composition can be accomplished by methods known in the art, like blowing hot air on the composition.

Alternatively, oxygen scavenging compositions that comprise microwave reactive materials can be exposed to microwave radiation resulting in initiation of oxygen scavenging. A microwave reactive material can also be applied to the surface of an oxygen scavenging structure (e.g., a film or a packaging article) that comprises an oxidizable organic compound and a transition metal catalyst, and the treated structure can be exposed to microwaves. This in turn speeds the kinetics of the reaction leading to onset of oxygen scavenging by the structure.

The oxygen scavenging composition and microwave reactive material are exposed to microwave radiation, when it is desired to initiate oxygen scavenging. Microwave radiation of about 1 GHz to about 3 GHz can be used in conjunction with microwave reactive materials to initiate scavenging, microwave radiation of about 2.5 GHz is preferred.

It is preferred that the microwave reactive material be a material selected from the group consisting of metal materials and materials comprising polar compounds (i.e. water). Metal materials that can be used as microwave reactive materials in the present invention can be provided in the form of metal foils, metal powders, metal meshes, metal staples, metal buttons and metal fibers. When the microwave reactive material is provided as a metal powder it is preferred that it be comprised of a material selected from the group consisting of aluminum, copper, iron and oxides thereof. Examples of materials comprising polar compounds that can be used as microwave reactive material include water, peroxides and peroxide solutions. An oxygen scavenging composition can comprise a microwave reactive material, particularly metal powders, metal fibers, and peroxides, or the microwave reactive material can comprise part of or all of a material that is applied to the cured oxygen scavenging composition.

Peroxide solutions can also be used as microwave reactive materials in certain embodiments of the present invention in which a microwave reactive material is applied to the surface of an oxygen scavenging composition that is provided in the form of a film or a packaging article. Typically, such peroxide solutions are aqueous solutions comprising about 2% to about 30% hydrogen peroxide.

Water by itself can be used as a microwave reactive material in the present invention, particularly in certain embodiments in which a microwave reactive material is applied to the surface of an oxygen scavenging composition in the form of a film or a packaging article.

IV. Use of Cured Oxygen Scavenging Polymer Compositions

As noted previously, certain embodiments of the present invention yield thermoset crosslinked compositions, while certain embodiments yield thermoplastic cured compositions. Furthermore, oxygen scavenging thermoset compositions of the present invention can be in the form of a coating on a surface of an article or as an adhesive joining two articles, among other possibilities.

One embodiment of the present invention is a method of preparing a solvent based oxygen scavenging coating that is thermoset (e.g., crosslinked), as described above. A coating solution is prepared that comprises at least one oxygen scavenging polymer and at least one curing agent as described above. The coating solution can in some cases require the use of at least one additional solvent to make the solution, but it in some cases the crosslinker or polymer is itself a liquid or in solution. Thus, the coating solution can in certain embodiments comprise at least one solvent selected from aliphatic hydrocarbons (like ketones, glycol ethers, and esters) and aromatic hydrocarbons. Aliphatic hydrocarbon solvents that can be used include methyl isobutyl ketone and methyl ethyl ketone, among others. Examples of aromatic hydrocarbon solvents that can be used include xylene, toluene, and trimethyl benzene, among others. Furthermore, the coating solution can further comprise at least one material selected from the following group: pigments, oxygen scavenging initiators, antioxidants, crosslinking catalysts and transition metal catalysts.

This coating solution is applied to the desired surface and the coating is permitted to cure. The coating solution can be applied to a surface by any of a number of methods known in the art. For example the coating solution can be sprayed onto the surface, the surface can be dipped into the coating solution, or the coating solution can be brushed onto the surface. Preferably the coating solution is cured at a temperature greater than about 25° C. Curing can take place in an oxygen-free environment or in an environment that comprises oxygen. In certain embodiments, the method further comprises initiating oxygen scavenging by the oxygen scavenging cured composition by one of the methods described above.

As an example of a solvent based coating method, a particular epoxy coating can be prepared by dissolving a hydroxyl terminated, low molecular weight oxygen scavenging polyester (e.g., the oxygen scavenging polymer described above that is the reaction product of cis-1,2,3,6-tetrahydrophthalic anhydride and at least one diol) in a solvent, like methylethylketone or toluene, along with a small amount of curing catalyst (e.g., dimethyl aniline), a transition metal catalyst (e.g., cobalt oleate), and any other appropriate additives, like pigments for example. When the coating is to be prepared, an epoxy crosslinker is added to the dissolved mixture and this is sprayed onto the surface to be coated. The thermoset coating is then cured at about room temperature or at an elevated temperature, preferably in an environment substantially free of oxygen.

Similarly, a particular isocyanate solvent based coating can be prepared by dissolving a hydroxyl or carboxylic terminated, low molecular weight oxygen scavenging polyester (e.g., the oxygen scavenging polymer described above that is the reaction product of cis-1,2,3,6-tetrahydrophthalic anhydride and at least one diol) in a solvent (e.g., methylethylketone), along with a transition metal catalyst, an oxygen scavenging initiator, and any other appropriate additives. When the coating is to be applied, the isocyanate crosslinker (e.g., aliphatic diisocyanate) is added to the dissolved mixture, and this is sprayed onto the surface to be coated. The isocyanate coating is cured, preferably in a substantially oxygen-free environment. The coating can be triggered to scavenge oxygen by exposure to heat or by UV depending on the oxygen scavenging initiator used. Solvent based melamine oxygen scavenging coatings that are thermoset can be prepared similarly to the isocyanate and epoxy solvent based coatings.

In another embodiment, the present invention is directed to a method of preparing a solventless oxygen scavenging coating. A blend comprising at least one oxygen scavenging polymer and at least one solid curing agent is prepared, as described above. Preferably, the oxygen scavenging polymer has a $T_g$ of between about 40° C. to about 80° C. The prepared blend is ground to a powder, which is applied to a surface and permitted to cure. The method can further comprise initiating oxygen scavenging by one of the methods described above. The blend can further comprise at least one material selected from the group consisting of pigments, oxygen scavenging initiators, antioxidants, crosslinking catalysts, alcohols, and transition metal catalysts.

The solventless oxygen scavenging coating can be applied by methods known in the art. For example, using the principle that opposite charges attract, the coating can be pneumatically fed from a reservoir through a spray gun where the powder gains a low amperage, high-voltage positive charge. Articles to be sprayed (e.g., metal cans) are electrically grounded, so that the positively charged powder particles are strongly attracted to the articles' surfaces. The powder coated articles are then pulled through an oven, where the powder is melted and fuses into a smooth coating. A positive characteristic of solventless oxygen scavenging compositions is that most do not release volatile organic chemicals when cured. Preferably, the curing agent used in preparing such solventless oxygen scavenging crosslinked coatings comprises material selected from the group consisting of epoxy crosslinkers and melamine crosslinkers. It is also preferred that solventless oxygen scavenging coatings of the present invention be cured at a temperature between about 150° C. and 350° C. Curing at temperatures in this range can be sufficient to both cure the coating and to initiate oxygen scavenging in certain embodiments.

An example of a method for preparing a particular solventless oxygen scavenging coating involves a low molecular weight oxygen scavenging terminated polyester (e.g., the oxygen scavenging polymer described above that is the reaction product of cis-1,2,3,6-tetrahydrophthalic anhydride and at least one diol) being compounded with a solid curing agent (e.g., a solid epoxy crosslinker or a solid melamine crosslinker). Preferably the oxygen scavenging polymer has a $T_g$ of about 40° C. to about 80° C., and can be compounded with the curing agent at a temperature of below about 100° C. Appropriate additives can be included during the compounding. For example, addition of an amine as a crosslinking catalyst that is triggered by elevated temperature is preferred. The compounded blend is then ground to a fine powder and sprayed onto the surface to be coated. Preferably the powder is cured to a coating at a temperature between about 150° C. and about 350° C. If a free radical oxygen scavenging initiator (e.g., a peroxide, as described above) that is triggered by heat is present in the formulation, then the coating may also be triggered to begin oxygen scavenging during the curing process. This approach, while requiring the use of powder coating technology that can require significant capital investment, has the advantage of not requiring the use of a solvent, and in certain embodiments oxygen scavenging initiation can be accomplished along with the curing process.

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

EXAMPLE 1

Synthesis of hydroxyl terminated oxygen scavenging polyester polyester: 426 grams (3 moles) of cyclohexenyl dimethanol, 456 g (3 moles) of 1,2,3,6-tetrahydrophthalic anhydride, 208 g (2 moles) of neopentyl glycol, 292 g (2 moles) of adipic acid, 19.2 g (0.1 moles) of 1,2,4-benzenetricarboxylic anhydride, and 177 g (1.5 moles) of 1,6-hexanediol are charged into a 3-L reaction kettle equipped with an agitator, nitrogen sparge, thermal couple and partial condenser. Under nitrogen protection, the reactor is heated slowly and after the mixture begins to melt the agitator is engaged. The mixture is heated to 180° C. and the water that is driven off by the heating is collected. After most of the water present in the mixture is removed and collected, the mixture is heated further to a temperature of between about 200° C. and about 240° C. Once the polymer is determined to have an acid number of less than about 2 mg KOH/g and/or is determined to have a number average molecular weight of about 1500, the reaction is stopped. The product is cooled to less than about 120° C., and then discharged slowly to a container. The polyester should have a hydroxyl number of about 75 mg KOH/g.

EXAMPLE 2

Synthesis of carboxyl terminated oxygen scavenging polyester: 426 grams (3 moles) of cyclohexenyl dimethanol, 456 g (3 moles) of 1,2,3,6-tetrahydrophthalic anhydride, 208 g (2 moles) of neopentyl glycol, 438 g (3 moles) of adipic acid, and 19.2 g (0.1 moles) of 1,2,4-benzenetricarboxylic anhydride are charged into a 3-L reaction kettle equipped with an agitator, nitrogen sparge, thermal couple and partial condenser. Under nitrogen protection, the reactor is heated slowly and after the mixture begins to melt the agitator is engaged. The mixture is heated to 180° C. and the water that is driven off by the heating is collected. After most of the water present in the mixture is removed and collected, the mixture is heated further to a temperature of between about 200° C. and about 240° C. Once the polymer is determined to have an acid number of less than about 85 mg KOH/g and/or to have a number average molecular weight of about 1400 the reaction is stopped. The product is cooled to less than about 150° C., and then discharged slowly to a container.

EXAMPLE 3

Preparation of isocyanate cured oxygen scavenging coating: 150 grams of hydroxyl terminated polyester made in example 1 and 0.75 g of cobalt oleate toluene solution containing 50 wt.% cobalt oleate are mixed with 250 g of toluene. 25.0 g of 4,4'-methylenebis(phenyl isocyanate) (MDI) are mixed into the above mixture immediately before use. The mixture can be spray- or brush-coated onto various metal surfaces, as well as onto surfaces comprising paper, wood, and plastics, among other materials., The oxygen scavenging coating can be cured at room temperature or at an elevated temperature, with or without vacuum.

EXAMPLE 4

Preparation of epoxy cured oxygen scavenging coating: 140 grams of hydroxyl terminated polyester made in example 1 and 0.75 g of cobalt oleate toluene solution containing 50 wt .% cobalt oleate, and 0.01 g of N,N-dimethylaniline are mixed with 250 g of toluene. 25.2 g of 3,4-epoxycyclohexylmethyl 3,4-epoxycyclohexanecarboxylate are combined with this mixture immediately before use. The solution can be spray- or brush-coated onto various metal surfaces, as well as surfaces that comprise paper, wood, and plastics, among other materials. The oxygen scavenging coating can be cured at room temperature or at an elevated temperature, with or without vacuum.

EXAMPLE 5

Preparation of melamine cured oxygen scavenging coating: 150 grams of hydroxyl terminated polyester made in example 1 and 0.75 g of cobalt oleate toluene solution containing 50 wt. % cobalt oleate, and 0.8 g of p-toluenesulfonic acid are mixed with 250 g of toluene. 40 g of hexakis(methoxymethylol)melamine (Cymel 303, product of Cytec) are combined with the mixture above immediately before use. The solution can be spray- or brush-coated onto various metal surfaces, as well as surfaces that comprise paper, wood, and plastics, among other materials. The oxygen scavenging coating can be cured at 130° C. for about 15 minutes with or without vacuum.

All of the compositions and methods disclosed and claimed herein can be made and executed without undue experimentation in light of the present disclosure. While the compositions and methods of this invention have been described in terms of preferred embodiments, it will be apparent to those of skill in the art that variations may be applied to the compositions and methods and in the steps or in the sequence of steps of the method described herein without departing from the concept, spirit and scope of the invention. More specifically, it will be apparent that certain agents which are chemically related may be substituted for the agents described herein while the same or similar results would be achieved. All such similar substitutes and modifications apparent to those skilled in the art are deemed to be within the spirit, scope and concept of the invention as defined by the appended claims.

What is claimed is:

1. An oxygen scavenging composition comprising:

at least one oxygen scavenging polymer that comprises (a) a polymeric backbone, (b) at least two curing functional groups that are terminal groups, (c) at least one oxygen scavenging cyclic moiety that is pendant to the polymeric backbone, wherein the cyclic moiety comprises a ring having from 5 to 9 carbon atoms and at least one carbon-carbon double bond;

at least one curing agent that comprises at least two functional groups that are capable of reacting with the curing functional groups of the oxygen scavenging polymer; and at least one transition metal catalyst.

2. The composition of claim 1, wherein the oxygen scavenging cyclic moiety is alicyclic or aromatic.

3. The composition of claim 2, wherein the oxygen scavenging cyclic moiety is cycloalkenyl.

4. The composition of claim 1, wherein the curing functional groups of the oxygen scavenging polymer are independently selected from the group consisting of hydroxyl groups, amino groups, and carboxylic groups.

5. The composition of claim 1, wherein the oxygen scavenging polymer is a polymer selected from the group consisting of polyols and polyesters.

6. The composition of claim 1, wherein the oxygen scavenging polymer comprises a polymer selected from the group consisting of hydroxyl terminated polyesters, hydroxyl terminated polyols, and carboxylic group terminated polyesters.

7. The composition of claim 1, wherein the oxygen scavenging polymer further comprises at least one curing functional group that is a pendant group.

8. The composition of claim 1, wherein the polymeric backbone of the oxygen scavenging polymer comprises at least one carbon in the ring of the oxygen scavenging cyclic moiety.

9. The composition of claim 8, wherein the oxygen scavenging cyclic moiety has a formula selected from the formula (III) and (IV); wherein formula (III) is (III)

wherein A is $-(CR_5R_6)_g-$, g is an integer from 0 to 3, inclusive; wherein E is $-(CR_7R_8)_p-$, p is an integer from 0 to 3, inclusive; $g+p \leq 3$; wherein $q_6$, $q_7$, $q_8$, $q_9$, r', each $R_5$, each $R_6$, each $R_7$, and each $R_8$ are independently selected from hydrogen, linear $C_1-C_{20}$ alkyls, branched $C_1-C_{20}$ alkyls, cyclic $C_1-C_{20}$ alkyls, polycyclic $C_1-C_{20}$ alkyls, aromatic groups, halogens, and sulfur-containing substituents, and when r' is hydrogen, at least one of $q_6$, $q_7$, $q_8$, and $q_9$ is hydrogen; and wherein formula (IV) is (IV)

wherein m is $-(CR_9R_{10})_h(CR_{11}R_{12})_j-$, wherein the ring carbon adjacent to the double bond is bonded to $R_9$ and $R_{10}$, h is an integer from 0 to 1, inclusive, j is an integer from 0 to 3, inclusive, and when $h+j \geq 1$, his 1; wherein $q_{10}$, $q_{11}$, $q_{12}$, $q_{13}$, r", $R_9$, $R_{10}$, each $R_{11}$, and each $R_{12}$ are independently selected hydrogen, linear $C_1-C_{20}$ alkyls, branched $C_1-C_{20}$ alkyls, cyclic $C_1-C_{20}$ alkyls, polycyclic $C_1-C_{20}$ alkyls, aromatic groups, halogens, and sulfur-containing substituents; and wherein when r" is hydrogen, at least one of $q_{10}$, $q_{11}$, $R_9$, and $R_{10}$ is hydrogen.

10. The composition of claim 1, wherein the oxygen scavenging cyclic moiety is pendant to the polymeric backbone of the oxygen scavenging polymer.

11. The composition of claim 10, wherein the pendant oxygen scavenging cyclic moiety has a formula selected from formula (I) and (II); wherein formula (I) is (I)

wherein Q is $-(CR_2R_3)_n-$, n is an integer from 0 to 3, inclusive; wherein Z is $-(CR_4R_5)_e-$, e is an integer from 0 to 3, inclusive; $n+e \leq 3$; wherein $q_0$, $q_1$, $q_2$, $q_3$, $q_4$, r, each $R_2$, each $R_3$, each $R_4$, and each $R_5$ are independently selected from hydrogen, linear $C_1-C_{20}$ alkyls, branched $C_1-C_{20}$ alkyls, cyclic $C_1-C_{20}$ alkyls, polycyclic $C_1-C_{20}$ alkyls, aromatic groups, halogens, and sulfur-containing substituents, and when r is hydrogen at least one of $q_1$, $q_2$, $q_3$, and $q_4$ is hydrogen; and wherein formula (II) is (II)

wherein $r_1$, $r_2$, $r_3$, $r_4$, and $r_5$ are independently selected from hydrogen, linear $C_1-C_{20}$ alkyls, branched $C_1-C_{20}$ alkyls, cyclic $C_1-C_{20}$ alkyls, polycyclic $C_1-C_{20}$ alkyls, aromatic groups, halogens, and sulfur-containing substituents.

12. The composition of claim 11, wherein the oxygen scavenging polymer further comprises a linking group linking the polymeric backbone and the oxygen scavenging cyclic moiety, wherein the linking group is selected from the group consisting of $C_1-C_{12}$ alkyls, $C_1-C_{12}$ esters, $C_1-C_{12}$ ethers, $C_1-C_{12}$ silicones, and linking groups with the formula $-(CH_2)_z-M-(CH_2)_m-$, wherein M is a linkage comprising oxygen, nitrogen, sulfur, silicon, or any combination thereof, z is an integer from 0 to 12, inclusive, and m is an integer from 0 to 12, inclusive, provided that when one of z or m is 0, the other is at least 1.

13. The composition of claim 12, wherein the linking group is selected from —O—(CHR$_0$)$_n$—; —(C=O)—O—(CHR$_0$)$_n$—; —NH—(CHR$_0$)$_n$—; —O—(C=O)—(CHR$_0$)$_n$—; —(C=O)—NH—(CHR$_0$)$_n$—; and —(C=O)—O—CHOH—CH$_2$—O—;

wherein R$_0$ is hydrogen, methyl, ethyl, propyl, or butyl; and n is an integer from 1 to 12, inclusive.

14. The composition of claim 10, wherein the polymeric backbone is unsaturated.

15. The composition of claim 1, wherein the oxygen scavenging polymer is the product of a reaction comprising cis-1,2,3,6-tetrahydrophthalic anhydride and at least one diol, wherein the oxygen scavenging polymer has a number average molecular weight between about 500 Mn and about 5000 Mn, and wherein the at least one oxygen scavenging cyclic moiety has the formula (IV), (IV)

wherein m is —(CR$_9$R$_{10}$)$_h$(CR$_{11}$R$_{12}$)$_j$—, wherein the ring carbon adjacent to the double bond is bonded to R$_9$ and R$_{10}$, h is 1, j is 0, wherein q$_{10}$, q$_{11}$, q$_{12}$, q$_{13}$, r", R$_9$, R$_{10}$, each R$_{11}$, and are each R$_{12}$ hydrogen.

16. The composition of claim 15, wherein the oxygen scavenging polymer further comprises at least one oxygen scavenging cyclic moiety that has a formula selected from formula (I), (II), (III), and (IV); wherein formula (I) is

(I)

wherein Q is —(CR$_2$R$_3$)$_n$—, n is an integer from 0 to 3, inclusive; wherein Z is —(CR$_4$R$_5$)$_e$—, e is an integer from 0 to 3, inclusive; n+e≦3; wherein q$_0$, q$_1$, q$_2$, q$_3$, q$_4$, r, each R$_2$, each R$_3$, each R$_4$, and each R$_5$ are independently selected from hydrogen, linear C$_1$–C$_{20}$ alkyls, branched C$_1$–C$_{20}$ alkyls, cyclic C$_1$–C$_{20}$ alkyls, polycyclic C$_1$–C$_{20}$ alkyls, aromatic groups, halogens, and sulfur-containing substituents, and when r is hydrogen at least one of q$_1$, q$_2$, q$_3$, and q$_4$ is hydrogen; wherein formula (II) is

(II)

wherein r$_1$, r$_2$, r$_3$, r$_4$, and r$_5$ are independently selected from hydrogen, linear C$_1$–C$_{20}$ alkyls, branched C$_1$–C$_{20}$ alkyls, cyclic C$_1$–C$_{20}$ alkyls, polycyclic C$_1$–C$_{20}$ alkyls, aromatic groups, halogens, and sulfur-containing substituents; wherein formula (III) is (III)

wherein A is —(CR$_5$R$_6$)$_g$—, g is an integer from 0 to 3, inclusive; wherein E is —(CR$_7$R$_8$)$_p$—, p is an integer from 0 to 3, inclusive; g+p≦3; wherein q$_6$, q$_7$, q$_8$, q$_9$, r', each R$_5$, each R$_6$, each R$_7$, and each R$_8$ are independently selected from hydrogen, linear C$_1$–C$_{20}$ alkyls, branched C$_1$–C$_{20}$ alkyls, cyclic C$_1$–C$_{20}$ alkyls, polycyclic C$_1$–C$_{20}$ alkyls, aromatic groups, halogens, and sulfur-containing substituents, and when r' is hydrogen, at least one of q$_6$, q$_7$, q$_8$, and q$_9$ is hydrogen; and wherein formula (IV) is (IV)

wherein m is —(CR$_9$R$_{10}$)$_h$(CR$_{11}$R$_{12}$)$_j$—, wherein the ring carbon adjacent to the double bond is bonded to R$_9$ and R$_{10}$, h is an integer from 0 to 1, inclusive, j is an integer from 0 to 3, inclusive, and when h+j≧1, h is 1; wherein q$_{10}$, q$_{11}$, q$_{12}$, q$_{13}$, r", R$_9$, R$_{10}$, each R$_{11}$, and each R$_{12}$ are independently selected hydrogen, linear C$_1$–C$_{20}$ alkyls, branched C$_1$–C$_{20}$ alkyls, cyclic C$_1$–C$_{20}$ alkyls, polycyclic C$_1$–C$_{20}$ alkyls, aromatic groups, halogens, and sulfur-containing substituents; and wherein when r" is hydrogen, at least one of q$_{10}$, q$_{11}$, R$_9$, and R$_{10}$ is hydrogen.

17. The composition of claim 16, wherein the polymer comprises an oxygen scavenging cyclic moiety having the formula (I) or (II), wherein in formula (I) Q is —(CR$_2$R$_3$)$_n$—, n is an integer from 0 to 3, inclusive; wherein Z is —(CR$_4$R$_5$)$_e$—, e is an integer from 0 to 3, inclusive; n+e≦3; wherein q$_0$, q$_1$, q$_2$, q$_3$, q$_4$, r, each R$_2$, each R$_3$, each R4, and each R$_5$ are independently selected from hydrogen, linear C$_1$–C$_{20}$ alkyls, branched C$_1$–C$_{20}$ alkyls, cyclic C$_1$–C$_{20}$ alkyls, polycyclic C$_1$–C$_{20}$ alkyls, aromatic groups, halogens, and sulfur-containing substituents, and when r is hydrogen at least one of q$_1$, q$_2$, q$_3$, and q$_4$ is hydrogen; and wherein in formula (II) r$_1$, r$_2$, r$_3$, r$_4$, and r$_5$ are independently selected from hydrogen, linear C$_1$–C$_{20}$ alkyls, branched C$_1$–C$_{20}$ alkyls, cyclic C$_1$–C$_{20}$ alkyls, polycyclic C$_1$–C$_{20}$ alkyls, aromatic groups, halogens, and sulfur-containing substituents; and wherein the oxygen scavenging polymer further comprises a linking group linking the polymeric backbone and the pendant cyclic organic moiety, wherein the linking group is selected from the group consisting of $C_1$–$C_{20}$ alkyls, $C_1$–$C_{20}$ esters, $C_1$–$C_{12}$ ethers, $C_1$–$C_{12}$ silicones, and linking groups with the formula —$(CH_2)_z$—M—$(CH_2)_m$—, wherein M is a linkage comprising oxygen, nitrogen, sulfur, silicon, or any combination thereof, z is an integer from 0 to 12, inclusive, and m is an integer from 0 to 12, inclusive, provided that when one of z or m is 0, the other is at least 1.

18. The composition of claim 1, wherein the curing agent comprises at least one compound selected from the group consisting of melamines, isocyanates, and epoxies.

19. The composition of claim 18, wherein the curing agent comprises a melamine compound and the curing functional groups of the oxygen scavenging polymer are independently selected from the group consisting of carboxylic groups and hydroxyl groups.

20. The composition of claim 19, wherein the melamine compound is hexakis(methoxymethylol)melamine.

21. The composition of claim 19, wherein the oxygen scavenging polymer has a number average molecular weight between about 500 Mn and 5000 Mn.

22. The composition of claim 19, wherein the oxygen scavenging polymer comprises a polyol or a polyester.

23. The composition of claim 22, wherein the oxygen scavenging polymer comprises a polymer selected from the group consisting of hydroxyl terminated polyesters, hydroxyl terminated polyols, and carboxylic group terminated polyesters.

24. The composition of claim 19, wherein the oxygen scavenging polymer is a hydroxyl terminated polyester having an hydroxyl number of between about 22.5 and about 225 mg KOH/g.

25. The composition of claim 19, wherein the oxygen scavenging polymer is a carboxylic group terminated polyester having an acid number between about 22.5 and 225 mg KOH/g.

26. The composition of claim 19, wherein the oxygen scavenging polymer is the product of a reaction comprising cis-1,2,3,6-tetrahydrophthalic anhydride and at least one diol, wherein the oxygen scavenging polymer has a number average molecular weight between about 500 Mn and about 5000 Mn, and wherein the at least one oxygen scavenging cyclic moiety has the formula (IV), (IV)

wherein m is —$(CR_9R_{10})_h(CR_{11}R_{12})_j$—, wherein the ring carbon adjacent to the double bond is bonded to $R_9$ and $R_{10}$, h is 1, j is 0, wherein $q_{10}$, $q_{11}$, $q_{12}$, $q_{13}$, r″, $R_9$, $R_{10}$, each $R_{11}$, and are each $R_{12}$ hydrogen.

27. The composition of claim 26, wherein the oxygen scavenging polymer further comprises at least one oxygen scavenging cyclic moiety that has a formula selected from formula (I), (II), (III), and (IV); wherein formula (I) is (I)

wherein Q is —$(CR_2R_3)_n$—, n is an integer from 0 to 3, inclusive; wherein Z is —$(CR_4R_5)_e$—, e is an integer from 0 to 3, inclusive; n+e≦3; wherein $q_0$, $q_1$, $q_2$, $q_3$, $q_4$, r, each $R_2$, each $R_3$, each R4, and each $R_5$ are independently selected from hydrogen, linear $C_1$–$C_{20}$ alkyls, branched $C_1$–$C_{20}$ alkyls, cyclic $C_1$–$C_{20}$ alkyls, polycyclic $C_1$–$C_{20}$ alkyls, aromatic groups, halogens, and sulfur-containing substituents, and when r is hydrogen at least one of $q_1$, $q_2$, $q_3$, and $q_4$ is hydrogen; wherein formula (II) is (II)

wherein $r_1$, $r_2$, $r_3$, $r_4$, and $r_5$ are independently selected from hydrogen, linear $C_1$–$C_{20}$ alkyls, branched $C_1$–$C_{20}$ alkyls, cyclic $C_1$–$C_{20}$ alkyls, polycyclic $C_1$–$C_{20}$ alkyls, aromatic groups, halogens, and sulfur-containing substituents; wherein formula (III) is (III)

wherein A is —$(CR_5R_6)_g$—, g is an integer from 0 to 3, inclusive; wherein E is —$(CR_7R_8)_p$—, p is an integer from 0 to 3, inclusive; g+p≦3; wherein $q_6$, $q_7$, $q_8$, $q_9$, r′, each $R_5$, each $R_6$, each $R_7$, and each $R_8$ are independently selected from hydrogen, linear $C_1$–$C_{20}$ alkyls, branched $C_1$–$C_{20}$ alkyls, cyclic $C_1$–$C_{20}$ alkyls, polycyclic $C_1$–$C_{20}$ alkyls, aromatic groups, halogens, and sulfur-containing substituents, and when r′ is hydrogen, at least one of $q_6$, $q_7$, $q_8$, and $q_9$ is hydrogen; and wherein formula (IV) is (IV)

wherein m is —$(CR_9R_{10})_h(CR_{11}R_{12})_j$—, wherein the ring carbon adjacent to the double bond is bonded to $R_9$ and $R_{10}$, h is an integer from 0 to 1, inclusive, j is an integer from 0 to 3, inclusive, and when h+j≧1, h is 1; wherein $q_{10}$, $q_{11}$, $q_{12}$, $q_{13}$, r", $R_9$, $R_{10}$, each $R_{11}$, and each $R_{12}$ are independently selected hydrogen, linear $C_1$–$C_{20}$ alkyls, branched $C_1$–$C_{20}$ alkyls, cyclic $C_1$–$C_{20}$ alkyls, polycyclic $C_1$–$C_{20}$ alkyls, aromatic groups, halogens, and sulfur-containing substituents; and wherein when r" is hydrogen, at least one of $q_{10}$, $q_{11}$, $R_9$, and $R_{10}$ is hydrogen.

28. The composition of claim 18, wherein the curing agent comprises an isocyanate compound and the curing functional groups of the oxygen scavenging polymer are hydroxyl groups.

29. The composition of claim 28, wherein the isocyanate compound comprises at least one material from the group consisting of toluene diisocyanate (TDI), methylene bisphenyl isocyanate (MDI), aliphatic diisocyanate (ADI), isophorone diisocyanate (IPDI), tetramethylxylylene diisocyanate (TMXDI), 3,3'-dimethyl-4,4'phenylene diisocyanate (TODI), and hexamethylene-1,6-diisocyanatehexane (HDI).

30. The composition of claim 28, wherein the oxygen scavenging polymer has a number average molecular weight between about 500 Mn and 5000 Mn.

31. The composition of claim 28, wherein the oxygen scavenging polymer has an acid number of less than about 2 mg KOH/g.

32. The composition of claim 28, wherein the oxygen scavenging polymer comprises a polyol or a polyester.

33. The composition of claim 32, wherein the oxygen scavenging polymer comprises a polymer selected from the group consisting of hydroxyl terminated polyesters, and hydroxyl terminated polyols.

34. The composition of claim 28, wherein the oxygen scavenging polymer is the product of a reaction comprising cis-1,2,3,6-tetrahydrophthalic anhydride and at least one diol, wherein the oxygen scavenging polymer has a number average molecular weight between about 500 Mn and about 5000 Mn, and wherein the at least one oxygen scavenging cyclic moiety has the formula (IV), (IV)

wherein m is —$(CR_9R_{10})_h(CR_{11}R_{12})_j$—, wherein the ring carbon adjacent to the double bond is bonded to $R_9$ and $R_{10}$, h is 1, j is 0, wherein $q_{10}$, $q_{11}$, $q_{12}$, $q_{13}$, r", $R_9$, $R_{10}$, each $R_{11}$, and are each $R_{12}$ hydrogen.

35. The composition of claim 34, wherein the oxygen scavenging polymer further comprises at least one oxygen scavenging cyclic moiety that has a formula selected from formula (I), (II), (III), and (IV); wherein formula (I) is

(I)

wherein Q is —$(CR_2R_3)_n$—, n is an integer from 0 to 3, inclusive; wherein Z is —$(CR_4R_5)_e$—, e is an integer from 0 to 3, inclusive; n+e≦3, wherein $q_0$, $q_1$, $q_2$, $q_3$, $q_4$, r, each $R_2$, each $R_3$, each R4, and each $R_5$ are independently selected from hydrogen, linear $C_1$–$C_{20}$ alkyls, branched $C_1$–$C_{20}$ alkyls, cyclic $C_1$–$C_{20}$ alkyls, polycyclic $C_1$–$C_{20}$ alkyls, aromatic groups, halogens, and sulfur-containing substituents, and when r is hydrogen at least one of $q_1$, $q_2$, $q_3$, and $q_4$ is hydrogen; wherein formula (II) is

(II)

wherein $r_1$, $r_2$, $r_3$, $r_4$, and $r_5$ are independently selected from hydrogen, linear $C_1$–$C_{20}$ alkyls, branched $C_1$–$C_{20}$ alkyls, cyclic $C_1$–$C_{20}$ alkyls, polycyclic $C_1$–$C_{20}$ alkyls, aromatic groups, halogens, and sulfur-containing substituents; wherein formula (III) is (III)

wherein A is —$(CR_5R_6)_g$—, g is an integer from 0 to 3, inclusive; wherein E is —$(CR_7R_8)_p$—, p is an integer from 0 to 3, inclusive; g+p≦3; wherein $q_6$, $q_7$, $q_8$, $q_9$, r', each $R_5$, each $R_6$, each $R_7$, and each $R_8$ are independently selected from hydrogen, linear $C_1$–$C_{20}$ alkyls, branched $C_1$–$C_{20}$ alkyls, cyclic $C_1$–$C_{20}$ alkyls, polycyclic $C_1$–$C_{20}$ alkyls, aromatic groups, halogens, and sulfur-containing substituents, and when r' is hydrogen, at least one of $q_6$, $q_7$, $q_8$, and $q_9$ is hydrogen; and wherein formula (IV) is (IV)

wherein m is —$(CR_9R_{10})_h(CR_{11}R_{12})_j$—, wherein the ring carbon adjacent to the double bond is bonded to $R_9$ and $R_{10}$, h is an integer from 0 to 1, inclusive, j is an integer from 0 to 3, inclusive, and when h+j≦1, h is 1; wherein $q_{10}$, $q_{11}$, $q_{12}$, $q_{13}$, r", $R_9$, $R_{10}$, each $R_{11}$, and each $R_{12}$ are independently selected hydrogen, linear $C_1$–$C_{20}$ alkyls, branched $C_1$–$C_{20}$ alkyls, cyclic $C_1$–$C_{20}$ alkyls, polycyclic $C_1$–$C_{20}$ alkyls, aromatic groups, halogens, and sulfur-containing substituents; and wherein when r" is hydrogen, at least one of $q_{10}$, $q_{11}$, $R_9$, and $R_{10}$ is hydrogen.

36. The composition of claim 18, wherein the curing agent comprises an epoxy compound and the curing functional groups of the oxygen scavenging polymer are carboxylic groups.

37. The composition of claim 36, wherein the polymer is a polyester.

38. The composition of claim 36, wherein the epoxy compound is selected from the group consisting of diglycidyl ether of bisphenol A and 3,4-epoxycyclohexylmethyl 3,4-epoxycyclohexanecarboxylate.

39. The composition of claim 36, wherein the oxygen scavenging polymer has a number average molecular weight between about 500 and 5000.

40. The composition of claim 36, wherein the oxygen scavenging polymer is a carboxylic group terminated polyester that has an acid number of between about 22.5 and 225 mg KOH/g.

41. The composition of claim 36, wherein the oxygen scavenging polymer is the product of a reaction comprising cis-1,2,3,6-tetrahydrophthalic anhydride and at least one diol, wherein the oxygen scavenging polymer has a number average molecular weight between about 500 Mn and about 5000 Mn, and wherein the at least one oxygen scavenging cyclic moiety has the formula (IV), (IV)

wherein m is $-(CR_9R_{10})_h(CR_{11}R_{12})_j-$, wherein the ring carbon adjacent to the double bond is bonded to $R_9$ and $R_{10}$, h is 1, j is 0, wherein $q_{10}$, $q_{11}$, $q_{12}$, $q_{13}$, r'', $R_9$, $R_{10}$, each $R_{11}$, and are each $R_{12}$ hydrogen.

42. The composition of claim 41, wherein the oxygen scavenging polymer further comprises at least one oxygen scavenging cyclic moiety that has a formula selected from formula (I), (II), (III), and (IV); wherein formula (I) is

(I)

wherein Q is $-(CR_2R_3)_n-$, n is an integer from 0 to 3, inclusive; wherein Z is $-(CR_4R_5)_e-$, e is an integer from 0 to 3, inclusive; n+e≦3; wherein $q_0$, $q_1$, $q_2$, $q_3$, $q_4$, r, each $R_2$, each $R_3$, each $R_4$, and each $R_5$ are independently selected from hydrogen, linear $C_1$–$C_{20}$ alkyls, branched $C_1$–$C_{20}$ alkyls, cyclic $C_1$–$C_{20}$ alkyls, polycyclic $C_1$–$C_{20}$ alkyls, aromatic groups, halogens, and sulfur-containing substituents, and when r is hydrogen at least one of $q_1$, $q_2$, $q_3$, and $q_4$ is hydrogen; wherein formula (II) is

(II)

wherein $r_1$, $r_2$, $r_3$, $r_4$, and $r_5$ are independently selected from hydrogen, linear $C_1$–$C_{20}$ alkyls, branched $C_1$–$C_{20}$ alkyls, cyclic $C_1$–$C_{20}$ alkyls, polycyclic $C_1$–$C_{20}$ alkyls, aromatic groups, halogens, and sulfur-containing substituents; wherein formula (III) is (III)

wherein A is $-(CR_5R_6)_g-$, g is an integer from 0 to 3, inclusive; wherein E is $-(CR_7R_8)_p-$, p is an integer from 0 to 3, inclusive; g+p≦3; wherein $q_6$, $q_7$, $q_8$, $q_9$, r', each $R_5$, each $R_6$, each $R_7$, and each $R_8$ are independently selected from hydrogen, linear $C_1$–$C_{20}$ alkyls, branched $C_1$–$C_{20}$ alkyls, cyclic $C_1$–$C_{20}$ alkyls, polycyclic $C_1$–$C_{20}$ alkyls, aromatic groups, halogens, and sulfur-containing substituents, and when r' is hydrogen, at least one of $q_6$, $q_7$, $q_8$, and $q_9$ is hydrogen; and wherein formula (IV) is (IV)

wherein m is $-(CR_9R_{10})_h(CR_{11}R_{12})_j-$, wherein the ring carbon adjacent to the double bond is bonded to $R_9$ and $R_{10}$, h is an integer from 0 to 1, inclusive, j is an integer from 0 to 3, inclusive, and when h+j≧1, h is 1; wherein $q_{10}$, $q_{11}$, $q_{12}$, $q_{13}$, r'', $R_9$, $R_{10}$ each $R_{11}$, and each $R_{12}$ are independently selected hydrogen, linear $C_1$–$C_{20}$ alkyls, branched $C_1$–$C_{20}$ alkyls, cyclic $C_1$–$C_{20}$ alkyls, polycyclic $C_1$–$C_{20}$ alkyls, aromatic groups, halogens, and sulfur-containing substituents; and wherein when r'' is hydrogen, at least one of $q_{10}$, $q_{11}$, $R_9$, and $R_{10}$ is hydrogen.

43. The composition of claim 1, wherein the transition metal catalyst is selected from the group consisting of cobalt oleate, cobalt stearate, and cobalt neodecanoate.

44. The composition of claim 1, further comprising at least one antioxidant.

45. The composition of claim 1, further comprising at least one oxygen scavenging initiator.

46. The composition of claims 45, wherein the initiator is capable of being activated by heat or by radiation.

47. The composition of claim 1, further comprising a crosslinking catalyst.

48. The composition of claim 1, wherein the composition is in the form of a thermoset coating.

49. The composition of claim 1, wherein the composition has adhesive properties.

50. The composition of claim 1, wherein the composition is thermoset.

51. The composition of claim 1, wherein the composition is thermoplastic.

52. An oxygen scavenging composition comprising,
at least one transition metal catalyst; and
at least one cured oxygen scavenging polymer that comprises a polymeric backbone, at least one oxygen scavenging cyclic moiety, wherein the cyclic moiety comprises a ring having from 5 to 9 carbon atoms and at least one carbon-carbon double bond, and
wherein the cured polymer is the product of a reaction of
(a) at least one low molecular weight oxygen scavenging polymer that has a number average molecular weight between about 500 Mn and about 5000 Mn, and (b) at least one curing agent, wherein the low molecular weight oxygen scavenging polymer comprises a polymeric backbone, at least two curing functional groups that are terminal groups, at least one oxygen scavenging cyclic moiety that is the same oxygen scavenging cyclic moiety of the cured polymer; and wherein the curing agent comprises at least two functional groups that are capable of reacting with the curing functional groups of the low molecular weight oxygen scavenging polymer.

53. The composition of claim 52, wherein the oxygen scavenging cyclic moiety is alicyclic or aromatic.

54. The composition of claim 53, wherein the oxygen scavenging cyclic moiety is cycloalkenyl.

55. The composition of claim 52, wherein the low molecular weight oxygen scavenging polymer comprises a polyol or a polyester.

56. The composition of claim 52, wherein the polymeric backbone of the oxygen scavenging polymer comprises at least one carbon in the ring of the oxygen scavenging cyclic moiety.

57. The composition of claim 52, wherein the oxygen scavenging cyclic moiety is pendant to the polymeric backbone of the oxygen scavenging polymer.

58. The composition of claim 57, wherein the low molecular weight oxygen scavenging polymer further comprises a linking group linking the polymeric backbone and the oxygen scavenging cyclic moiety, and wherein the linking group is selected from the group consisting of $C_1$–$C_{12}$ alkyls, $C_1$–$C_{12}$ esters, $C_1$–$C_{12}$ ethers, $C_1$–$C_{12}$ silicones, and linking groups with the formula —$(CH_2)_z$—$M$—$(CH_2)_m$—, wherein M is a linkage comprising oxygen, nitrogen, sulfur, silicon, or any combination thereof, z is an integer from 0 to 12, inclusive, and m is an integer from 0 to 12, inclusive, provided that when one of z or m is 0, the other is at least 1.

59. The composition of claim 58, wherein the linking group is selected from
—O—$(CHR_0)_n$—; —(C=O)—O—$(CHR_0)_n$—; —NH—$(CHR_0)_n$—; —O—(C=O)—$(CHR_0)_n$—; —(C=O)—NH—$(CHR_0)_n$—; and —(C=O)—O—CHOH—$CH_2$—O—;

wherein $R_0$ is hydrogen, methyl, ethyl, propyl, or butyl; and n is an integer from 1 to 12, inclusive.

60. The composition of claim 52, wherein the oxygen scavenging polymer further comprises at least one curing functional group that is a pendant group.

61. The composition of claim 52, wherein the curing functional groups of the low molecular weight oxygen scavenging polymer are independently selected from the group consisting of hydroxyl groups, amino groups, carboxylic groups, sulfonic groups, and epoxy groups.

62. The composition of claim 52, wherein the low molecular weight oxygen scavenging polymer is a polymer selected from the group consisting of hydroxyl terminated polyesters, hydroxyl terminated polyols, and carboxylic group terminated polyesters.

63. The composition of claim 52, wherein the curing agent is a compound selected from the group consisting of melamines, isocyanates, and epoxies.

64. The composition of claim 52, further comprising at least one material selected from the group consisting of additional polymers, pigments, oxygen scavenging initiators, antioxidants, and reaction catalysts.

65. The composition of claim 52, wherein the composition is a solvent based oxygen scavenging coating.

66. The composition of claim 52, wherein the composition is a solventless based oxygen scavenging coating.

67. The composition of claim 52, wherein the composition is thermoset.

68. The composition of claim 52, wherein the curing agent is an epoxy compound or an isocyanate compound and the composition is thermoplastic.

* * * * *

UNITED STATES PATENT AND TRADEMARK OFFICE
CERTIFICATE OF CORRECTION

PATENT NO. : 6,527,976 B1
DATED : March 4, 2003
INVENTOR(S) : Gangfeng Cai, Ta Yen Ching and Hu Yang It is certified that error appears in the above-identified patent and that said Letters Patent is hereby corrected as shown below:

Column 22,
Line 14, delete "his" and insert -- h is --.
Line 66, delete the "," after "—$(CH_2)_z$".

Column 23,
Line 59, delete "—$CR_2R_3)_n$—," and insert -- —$(CR_2R_3)_n$—, --.

Column 24,
Line 60, delete "R4" and insert -- $R_4$ --.

Column 25,
Lines 5-6, delete "$C_1$-$C_{20}$ alkyls" and insert -- $C_1$-$C_{12}$ alkyls --.
Line 6, delete "$C_1$-$C_{20}$ esters" and insert -- $C_1$-$C_{12}$ esters --.

Column 27,
Line 67, "n+e≤3," and insert -- n+e≤3; --.

Column 28,
Line 53, delete "≤" and insert -- ≥ --.

Column 30,
Line 34, after "$R_{10}$" insert a -- , --.

Column 31,
Line 34, delete "M_$(CH2)_m$—," and insert -- M—$(CH_2)_m$—, --.

Signed and Sealed this

Ninth Day of September, 2003

JAMES E. ROGAN
*Director of the United States Patent and Trademark Office*